US009210534B1

United States Patent
Matthieu et al.

(10) Patent No.: US 9,210,534 B1
(45) Date of Patent: Dec. 8, 2015

(54) LOCATION ASSISTANCE IN A MACHINE TO MACHINE INSTANT MESSAGING SYSTEM

(71) Applicant: Citrix Systems, Inc., Fort Lauderdale, FL (US)

(72) Inventors: Chris Matthieu, Tempe, AZ (US); Geir Ramleth, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/626,562

(22) Filed: Feb. 19, 2015

(51) Int. Cl.
  *G06F 15/16* (2006.01)
  *H04W 4/00* (2009.01)
  *H04W 4/02* (2009.01)
  *H04L 12/58* (2006.01)
  *H04L 29/06* (2006.01)
  *G06F 12/00* (2006.01)

(52) U.S. Cl.
  CPC ............... *H04W 4/005* (2013.01); *H04L 29/06* (2013.01); *H04L 51/043* (2013.01); *H04L 51/38* (2013.01); *H04W 4/02* (2013.01); *H04W 4/021* (2013.01)

(58) Field of Classification Search
  USPC ............ 709/203, 223–229, 250, 230
  See application file for complete search history.

(56) References Cited

U.S. PATENT DOCUMENTS

| | | | |
|---|---|---|---|
| 2005/0015507 A1* | 1/2005 | Chin | 709/230 |
| 2008/0064391 A1* | 3/2008 | Cai et al. | 455/426.1 |
| 2009/0206986 A1* | 8/2009 | Murakami et al. | 340/5.8 |
| 2011/0001605 A1* | 1/2011 | Kiani et al. | 340/5.6 |
| 2011/0063105 A1* | 3/2011 | Bennett et al. | 340/539.11 |
| 2012/0323368 A1* | 12/2012 | White et al. | 700/275 |
| 2014/0149559 A1* | 5/2014 | Parviainen-Jalanko et al. | 709/220 |
| 2014/0149771 A1* | 5/2014 | Krishna et al. | 713/323 |
| 2015/0149478 A1* | 5/2015 | Krishna et al. | 709/220 |

\* cited by examiner

*Primary Examiner* — Zarni Maung
(74) *Attorney, Agent, or Firm* — Kilpatrick Townsend & Stockton LLP

(57) ABSTRACT

A cloud computing messaging system for location-based searching for Internet of Things (IoT) devices includes data processors, a receiver, and a transmitter. The system includes a storage medium containing instructions for the processors to receive a communication from a first IoT device connected with the system using a first protocol. The communication includes a location query and is received using the first protocol. The processors determine a second IoT device having a location that matches the location query. The second IoT device is connectable using a second protocol. The processors transmit information to the first IoT device related to the second IoT device and is transmitted using the first protocol. The processors receive a transmission from the first IoT device for the second IoT device using the first protocol, translate the transmission to the second protocol, and transmit the translated transmission to the second IoT device using the second protocol.

20 Claims, 9 Drawing Sheets

600

```
┌─────────────────────────────────────────────────────────────────────────┐
│  RECEIVE, ON A CLOUD COMPUTING MESSAGING SYSTEM, A COMMUNICATION FROM A │
│  FIRST IOT DEVICE, WHEREIN THE FIRST IOT DEVICE IS COMMUNICATIVELY      │
│  CONNECTED WITH THE CLOUD COMPUTING MESSAGING SYSTEM USING A FIRST      │
│  CONNECTION PROTOCOL, WHEREIN THE COMMUNICATION COMPRISES A LOCATION    │
│  QUERY, AND WHEREIN THE COMMUNICATION IS RECEIVED USING THE FIRST       │
│  CONNECTION PROTOCOL                                                    │
│  602                                                                    │
└─────────────────────────────────────────────────────────────────────────┘
                                    ↓
┌─────────────────────────────────────────────────────────────────────────┐
│  DETERMINE A SECOND IOT DEVICE HAVING A LOCATION, WHEREIN THE LOCATION  │
│  MATCHES THE LOCATION QUERY, AND WHEREIN THE SECOND IOT DEVICE IS       │
│  CONNECTABLE USING A SECOND CONNECTION PROTOCOL                         │
│  604                                                                    │
└─────────────────────────────────────────────────────────────────────────┘
                                    ↓
┌─────────────────────────────────────────────────────────────────────────┐
│  TRANSMIT INFORMATION TO THE FIRST IOT DEVICE, WHEREIN THE INFORMATION  │
│  IS RELATED TO THE SECOND IOT DEVICE, AND WHEREIN THE INFORMATION IS    │
│  TRANSMITTED USING THE FIRST CONNECTION PROTOCOL                        │
│  606                                                                    │
└─────────────────────────────────────────────────────────────────────────┘
                                    ↓
┌─────────────────────────────────────────────────────────────────────────┐
│  RECEIVE A TRANSMISSION FROM THE FIRST IOT DEVICE FOR THE SECOND IOT    │
│  DEVICE USING THE FIRST CONNECTION PROTOCOL                             │
│  608                                                                    │
└─────────────────────────────────────────────────────────────────────────┘
                                    ↓
┌─────────────────────────────────────────────────────────────────────────┐
│  TRANSLATE THE TRANSMISSION FROM THE FIRST CONNECTION PROTOCOL TO THE   │
│  SECOND CONNECTION PROTOCOL                                             │
│  610                                                                    │
└─────────────────────────────────────────────────────────────────────────┘
                                    ↓
┌─────────────────────────────────────────────────────────────────────────┐
│  TRANSMIT THE TRANSLATED TRANSMISSION TO THE SECOND IOT DEVICE USING    │
│  THE SECOND PROTOCOL                                                    │
│  612                                                                    │
└─────────────────────────────────────────────────────────────────────────┘
```

RECEIVE A COMMUNICATION FROM A FIRST IOT DEVICE, WHEREIN THE FIRST IOT DEVICE IS COMMUNICATIVELY CONNECTED WITH THE CLOUD COMPUTING MESSAGING SYSTEM USING A FIRST CONNECTION PROTOCOL, WHEREIN THE COMMUNICATION COMPRISES A DETECTION RADIUS OF THE FIRST IOT DEVICE; AND WHEREIN THE COMMUNICATION IS RECEIVED USING THE FIRST CONNECTION PROTOCOL

702

DETERMINE A SECOND IOT DEVICE BASED ON THE SECOND IOT DEVICE BEING LOCATED WITHIN THE DETECTION RADIUS OF THE FIRST IOT DEVICE, WHEREIN THE SECOND IOT DEVICE IS CONNECTABLE USING A SECOND CONNECTION PROTOCOL

704

TRANSMIT INFORMATION TO THE FIRST IOT DEVICE, WHEREIN THE INFORMATION IS RELATED TO THE SECOND IOT DEVICE, WHEREIN THE INFORMATION IS TRANSMITTED USING THE FIRST CONNECTION PROTOCOL

RECEIVE A COMMUNICATION FROM A FIRST IOT OBJECT, WHEREIN THE FIRST IOT OBJECT IS COMMUNICATIVELY CONNECTED WITH THE CLOUD COMPUTING MESSAGING SYSTEM USING A CONNECTION PROTOCOL, WHEREIN THE FIRST IOT OBJECT COMPRISES A FIRST IOT DEVICE, A FIRST THIRD-PARTY MESSAGING ACCOUNT, OR A FIRST COMPUTING DEVICE, WHEREIN THE COMMUNICATION COMPRISES A REQUEST TO CONNECT WITH A SECOND IOT OBJECT, WHEREIN THE SECOND IOT OBJECT COMPRISES A SECOND IOT DEVICE, A SECOND THIRD-PARTY MESSAGING ACCOUNT, OR A SECOND COMPUTING DEVICE, AND WHEREIN THE COMMUNICATION IS RECEIVED USING THE CONNECTION PROTOCOL

802

---

ANALYZE A PLURALITY OF IOT OBJECTS AGAINST ONE OR MORE CHARACTERISTICS OF THE SECOND IOT OBJECT TO IDENTIFY A SUGGESTED IOT OBJECT, WHEREIN EACH OF THE PLURALITY OF IOT OBJECTS IS CONNECTABLE WITH THE CLOUD COMPUTING MESSAGING SYSTEM

804

---

TRANSMIT INFORMATION RELATED TO THE SUGGESTED IOT OBJECT TO THE FIRST IOT OBJECT, WHEREIN THE INFORMATION IS TRANSMITTED USING THE FIRST CONNECTION PROTOCOL

LOCATION ASSISTANCE IN A MACHINE TO MACHINE INSTANT MESSAGING SYSTEM

BACKGROUND OF THE INVENTION

Networks provide the ability for network connectable devices to communicate with one another. For example, Internet of Things (IoT) systems allow communication among various IoT devices and/or other devices. Many IoT systems provide a limited selection of devices that can interface with one another, such as devices that share a common source and/or manufacturer, devices that operate using a common proprietary connection protocol or interface, devices that have built-in communications capabilities, or the like. Typically, IoT systems enable only simple interactions between devices, oftentimes allowing only a single layer of processing and/or communication. IoT systems that may enable more complex interactions between devices tend to only allow devices to communicate with other devices that share a common proprietary connection protocol or interface.

BRIEF SUMMARY OF THE INVENTION

Broad Brief Paragraphs for Each of Three Ideas

In one embodiment, a cloud computing messaging system for facilitating a location-based search for an Internet of Things (IoT) device is provided. The cloud computing messaging system may include one or more data processors, a receiver, and a transmitter. The cloud computing messaging system may also include a non-transitory computer-readable storage medium containing instructions which when executed on the one or more data processors, cause the one or more processors to perform operations including receiving, using the receiver, a communication from a first IoT device. The first IoT device may be communicatively connected with the cloud computing messaging system using a first connection protocol. The communication may include a location query and may be received using the first connection protocol. The non-transitory computer-readable storage medium may also contain instructions which when executed on the one or more data processors, cause the one or more processors to perform operations including determining a second IoT device having a location. The location may match the location query. The second IoT device may be connectable using a second connection protocol. The non-transitory computer-readable storage medium may further contain instructions which when executed on the one or more data processors, cause the one or more processors to perform operations including transmitting, using the receiver, information to the first IoT device. The information may be related to the second IoT device and may be transmitted using the first connection protocol. The non-transitory computer-readable storage medium may also contain instructions which when executed on the one or more data processors, cause the one or more processors to perform operations including receiving a transmission from the first IoT device for the second IoT device using the first connection protocol, translating the transmission from the first connection protocol to the second connection protocol, and transmitting the translated transmission to the second IoT device using the second protocol.

In another embodiment, a computer-implemented method of facilitating a location-based search for an Internet of Things (IoT) device is provided. The method may include receiving, on a cloud computing messaging system, a communication from a first IoT device. The first IoT device may be communicatively connected with the cloud computing messaging system using a first connection protocol. The communication may include a location query and may be received using the first connection protocol. The method may also include determining a second IoT device having a location that matches the location query. The second IoT device may be connectable using a second connection protocol. The method may further include transmitting information to the first IoT device. The information may be related to the second IoT device and may be transmitted using the first connection protocol. The method may also include receiving a transmission from the first IoT device for the second IoT device using the first connection protocol, translating the transmission from the first connection protocol to the second connection protocol, and transmitting the translated transmission to the second IoT device using the second protocol.

In another embodiment, a computer-program product tangibly embodied in a non-transitory machine-readable storage medium of a cloud computing messaging system is provided. The computer-program product may include instructions configured to cause one or more data processors to receive a communication from a first IoT device. The first IoT device may be communicatively connected with the cloud computing messaging system using a first connection protocol. The communication may include a location query and may be received using the first connection protocol. The computer-program product may also include instructions configured to cause one or more data processors to determine a second IoT device having a location that matches the location query. The second IoT device may be connectable using a second connection protocol. The computer-program product may further include instructions configured to cause one or more data processors to transmit information to the first IoT device. The information may be related to the second IoT device and may be transmitted using the first connection protocol. The computer-program product may also include instructions configured to cause one or more data processors to receive a transmission from the first IoT device for the second IoT device using the first connection protocol, translate the transmission from the first connection protocol to the second connection protocol and transmit the translated transmission to the second IoT device using the second connection protocol.

In one embodiment, a cloud computing messaging system for facilitating the detection of an Internet of Things (IoT) object within the proximity of another IoT device is provided. The cloud computing messaging system may include one or more data processors and a receiver for receiving a communication from a first IoT device. The first IoT device may be communicatively connected with the cloud computing messaging system using a first connection protocol. The communication may include a detection radius of the first IoT device and may be received using the first connection protocol. The cloud computing messaging system may also include a non-transitory computer-readable storage medium containing instructions which when executed on the one or more data processors, cause the one or more processors to perform operations including determining a second IoT device based on the second IoT device being located within the detection radius of the first IoT device. The second IoT device may be connectable using a second connection protocol. The cloud computing messaging system may further include a transmitter for transmitting information to the first IoT device. The information may be related to the second IoT device and may be transmitted using the first connection protocol.

In another embodiment, a computer-implemented method of facilitating the detection of an Internet of Things (IoT) object within the proximity of another IoT device is provided. The method may include receiving, on a cloud computing messaging system, a communication from a first IoT device.

The first IoT device may be communicatively connected with the cloud computing messaging system using a first connection protocol. The communication may include a detection radius of the first IoT device and may be received using the first connection protocol. The method may also include determining a second IoT device based on the second IoT device being located within the detection radius of the first IoT device. The second IoT device may be connectable using a second connection protocol. The method may further include transmitting information to the first IoT device. The information may be related to the second IoT device and may be transmitted using the first connection protocol.

In another embodiment, a computer-program product tangibly embodied in a non-transitory machine-readable storage medium of a cloud computing messaging system is provided. The computer-program product may include instructions configured to cause one or more data processors to receive a communication from a first IoT device. The first IoT device may be communicatively connected with the cloud computing messaging system using a first connection protocol. The communication may include a detection radius of the first IoT device and may be received using the first connection protocol. The computer-program product may also include instructions configured to cause one or more data processors to determine a second IoT device based on the second IoT device being located within the detection radius of the first IoT device. The second IoT device may be connectable using a second connection protocol. The computer-program product may further include instructions configured to cause one or more data processors to transmit information to the first IoT device. The information may be related to the second IoT device and may be transmitted using the first connection protocol.

In one embodiment, a cloud computing messaging system for providing suggested IoT object with which another IoT object can connect is provided. The cloud computing messaging system may include one or more data processors and a receiver for receiving a communication from a first IoT object. The first IoT object may be communicatively connected with the cloud computing messaging system using a connection protocol. The first IoT object may include a first IoT device, a first third-party messaging account, or a first computing device. The communication may include a request to connect with a second IoT object. The second IoT object may include a second IoT device, a second third-party messaging account, or a second computing device. The communication may be received using the connection protocol. The cloud computing messaging system may also include a non-transitory computer-readable storage medium containing instructions which when executed on the one or more data processors, cause the one or more processors to perform operations including analyzing a plurality of IoT objects against the one or more characteristics of the second IoT object to identify a suggested IoT object. Each of the plurality of IoT objects may be connectable with the cloud computing messaging system. The cloud computing messaging system may further include a transmitter for transmitting information related to the suggested IoT object to the first IoT object. The information may be transmitted using the first connection protocol.

In another embodiment, a computer-implemented method of providing suggested IoT object with which another IoT object can connect is provided. The method may include receiving, on a cloud computing messaging system, a communication from a first IoT object. The first IoT object may be communicatively connected with the cloud computing messaging system using a connection protocol. The first IoT object may be a first IoT device, a first third-party messaging account, or a first computing device. The communication may include a request to connect with a second IoT object. The second IoT object may be a second IoT device, a second third-party messaging account, or a second computing device. The communication may be received using the connection protocol. The method may also include analyzing a plurality of IoT objects against the one or more characteristics of the second IoT object to identify a suggested IoT object. Each of the plurality of IoT objects may be connectable with the cloud computing messaging system. The method may further include transmitting information related to the suggested IoT object to the first IoT object. The information may be transmitted using the first connection protocol.

In another embodiment, a computer-program product tangibly embodied in a non-transitory machine-readable storage medium of a cloud computing messaging system is provided. The computer-program product may include instructions configured to cause one or more data processors to receive a communication from a first IoT object. The first IoT object may be communicatively connected with the cloud computing messaging system using a connection protocol. The first IoT object may be a first IoT device, a first third-party messaging account, or a first computing device. The communication may include a request to connect with a second IoT object. The second IoT object may be a second IoT device, a second third-party messaging account, or a second computing device. The communication may be received using the connection protocol. The computer-program product may also include instructions configured to cause one or more data processors to analyze a plurality of IoT objects against the one or more characteristics of the second IoT object to identify a suggested IoT object. Each of the plurality of IoT objects may be connectable with the cloud computing messaging system. The computer-program product may further include instructions configured to cause one or more data processors to transmit information related to the suggested IoT object to the first IoT object. The information may be transmitted using the first connection protocol.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6 is a flowchart illustrating an embodiment of a process of facilitating a location-based search for an Internet of Things (IoT) device, according to some embodiments.

FIG. 7 is a flowchart illustrating an embodiment of a process of facilitating the detection of an Internet of Things (IoT) object within the proximity of another IoT device, according to some embodiments.

FIG. 8 is a flowchart illustrating an embodiment of a process of providing suggested IoT object with which another IoT object can connect, according to some embodiments.

DETAILED DESCRIPTION OF THE INVENTION

Figure 1:
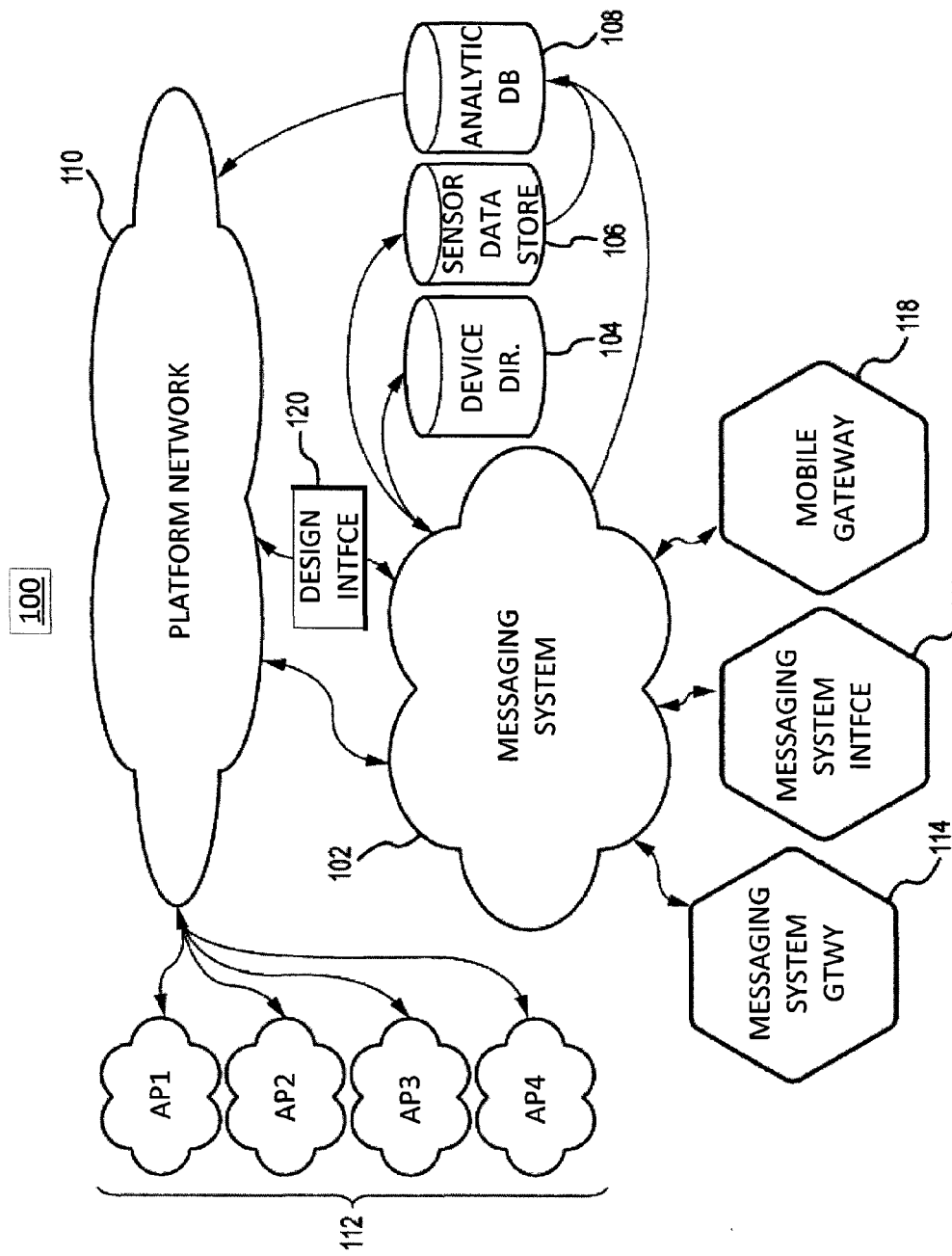
FIG. 1 is a system diagram illustrating an example of a system for connecting devices, such as Internet of Things (IoT) devices, other devices or machines, and/or systems, according to some embodiments.

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Networks provide the ability for network connectable devices to communicate with one another. For example, Internet of Things (IoT) systems allow communication among various IoT devices and/or other devices. An IoT system may provide only a limited selection of devices that can interface with one another using the IoT system. For example, devices that can utilize an IoT system may be limited to devices that share a common source and/or manufacturer, devices that operate using a common proprietary connection protocol or interface, devices that have built-in communications capabilities, and/or the like. Limiting the types of devices that can communicate using a specific IoT system constrains the types of functions that can be performed by the devices. For example, a motion sensor built by a manufacture and that uses a first connection protocol may not be capable of communicating with a burglary alarm system built by a different manufacturer and that uses a second connection protocol. Furthermore, vendors that may provide the ability for devices that use different proprietary protocols to communicate have to go through each device's proprietary application programming interface to facilitate message exchange between the devices. For example, a server may receive a message from a first device that uses a first proprietary connection protocol and application programming interface that is destined for a second device that uses a second proprietary connection protocol and application programming interface. The server must send the message to the proprietary cloud server with which the second device is controlled, and the proprietary cloud server accesses the application programming interface used by the second device and sends the message to the second device. The requirement of the server to go through the proprietary cloud server for the message to the sent to the second device adds latency to the message transport from the first device to the second device. Accordingly, techniques and systems are described for providing a common messaging system or interface that allows various devices to exchange machine-to-machine instant messages regardless of whether the devices are built by different manufacturers, operate using different connection protocols or interfaces, or whether the devices are built with the ability to communicate with a network.

FIG. 1 depicts a system 100 for connecting devices, such as IoT devices, other devices or machines, and/or systems. An IoT device may include any network-connectable device or system having sensing or control functionality. An IoT device may be connectable to a local area network (LAN), a personal area network (PAN), and to a wide area network (WAN). For example, an IoT device may include one or more radios operating using one or more communications protocols that allow the IoT device to connect to one or more LANs or PANs, such as WiFi™, ZigBee™, Bluetooth™, Bluetooth low Energy™ (BLE), Infrared Data Association, Transmission Control Protocol (TCP), User Datagram Protocol (UDP), and any other suitable protocol that allows connection to a LAN. A LAN may interconnect various network devices and provide the network devices with the ability to connect to a WAN. A router, modem, access point, or other switching mechanism may be used to control and manage the connections to the network devices. A PAN may provide network access for a user's personal devices (e.g., a network for connecting devices worn or carried by the user, for connecting devices located in the user's workspace, or the like), and may further provide access to other networks, such as a LAN or a WAN. The IoT device may further include one or more radios that allow the IoT device to connect to a WAN, such as the Internet, a private cloud network, a public cloud network, or any other network external to a local network. The system 100 may also include third-party messaging services (e.g., Facebook, twitter, LinkedIn, SMS, etc.) as well as non-IoT devices and systems.

The system 100 may include one or more remote servers, or clouds, that are in communication with other devices or systems via a network, such as the Internet, an intranet, a LAN, a PAN, or a WAN. For example, the system 100 includes a common messaging system 102 (or messaging system 102) that supports machine-to-machine instant message exchange in real-time or near real-time. In some embodiments, the messaging system 102 may be an open source machine-to-machine messaging platform, enabling IoT devices, other devices or machines, and/or systems to message or otherwise communicate with any other IoT devices, other devices or machines, and/or systems. The messaging system 102 may be implemented by one or more remote servers and may allow a IoT device, other device or machine, and/or a system to exchange communications or messages with another device or system regardless of whether the devices or systems are built by different manufacturers, operate using different connection protocols or interfaces, or whether the devices or systems are built with the ability to communicate with a network. While only a single messaging system 102 is shown, one of ordinary skill in the art will appreciate that multiple private or public messaging systems may be implemented using the techniques described herein. One or more remote servers of the messaging system 102 may be connected to a network via the Internet and/or other connection platforms (e.g., a WAN and/or a LAN) such that the servers may be accessed from anywhere in the world. The remote servers allow IoT devices, other devices or machines, and/or systems connected to the servers via the network to communicate and exchange messages with other IoT devices, other devices or machines, and/or systems from anywhere in the world. The remote servers may be configured with enough processing power to run an application, store and process data, and/or perform any other computing task. In some examples, the remote servers may provide enough processing power to operate applications running on devices located remotely from the servers and applications running on the servers themselves.

Messaging system 102 may be configured to support multiple connection protocols, such as any suitable machine-to-machine connection protocol. For example, the messaging system 102 may support connection protocols such as hypertext transfer protocol (HTTP), websockets, message queuing telemetry transport (MQTT), constrained application protocol (CoAP), Extensible Messaging and Presence Protocol (XMPP), Simple Network Management Protocol (SNMP), AllJoyn, and/or any other suitable connection protocol. The multiple connection protocols supported by the messaging system 102 may be referred to herein as native connection protocols of the messaging system 102. Messaging system 102 may also support multiple developer platforms, such as one or more software developer kits (SDKs). For example, the messaging system may support SDKs such as Node.JS, JavaScript, Python, Ruby, or any other suitable SDK. The support of multiple developer platforms and protocols provides programmers with the flexibility to customize functions, instructions, and commands for IoT devices, other devices or machines, and/or systems connected to messaging system 102.

The messaging system 102 may include a cloud infrastructure system that provides cloud services. In certain embodiments, services provided by the cloud infrastructure of messaging system 102 may include a host of services that are made available to users of the cloud infrastructure system on demand, such as registration, access control, and message routing for users, devices or machines, systems, or components thereof. Services provided by the messaging system 102 can be dynamically scaled to meet the demands of users. The messaging system 102 may comprise one or more computers, servers, and/or systems. In some embodiments, the computers, servers, and/or systems that make up the cloud network of the messaging system 102 are different from a user's own on-premises computers, servers, and/or systems. For example, the cloud network may host an application, and a user may, via a communication network such as a WAN, LAN, and/or PAN, on demand, order and use the application. In some embodiments, the cloud network of the messaging system 102 may host a Network Address Translation Traversal application to establish a secure connection between the messaging system 102 and a device or machine. A separate secure connection (e.g., using a native protocol of the messaging system 102) may be established by each device or machine for communicating with the messaging system 102. In certain embodiments, the cloud network of the messaging system 102 may include a suite of applications, middleware, or firmware that can be accessed by a user, device or machine, system, or component thereof.

Upon registering with the messaging system 102, each device or machine, person, and/or system may be assigned a unique identifier and a security token. For example, a device (IoT or other device) or system connected to the messaging system, a person associated with an account or an application that utilizes the messaging system, or the like may be assigned or otherwise provided with a distinct universally unique identifier (UUID) and/or a distinct security token. Each IoT device, other device or machine, system, and/or person using a device must communicate its distinct UUID and security token to the messaging system 102 in order to access the messaging system 102. The messaging system 102 may authenticate the IoT device, other device or machine, system, and/or person using each respective distinct UUID and token. The messaging system 102 may use the UUIDs to process, route, and/or otherwise manage messages and other communications to an appropriate device, person, system, and/or machine. For example, a device may send a message with its UUID and a destination UUID for the device, system, or person to which the message is destined. The messaging system 102 may process, route, and/or otherwise manage the message so that it is received at the appropriate destination.

In some embodiments, one or more components or programs of a device or system may also be assigned a unique identifier and a security token. In some cases, the unique identifier and/or token for the components of a device or system may be the same as the unique identifier and/or token of the device or system itself. In some cases, the unique identifier and/or token for a component or program of a device or system may be different from that of the device or system and may be unique only to the component or program. In some embodiments, components of a device or system that may be assigned a unique identifier may include a sensor (e.g., a camera, motion sensor, temperature sensor, accelerometer, gyroscope, or any other available sensor), an output (e.g., a microphone, siren, display, light, tactile output, or any other available output), a third-party messaging service that the device or system is able to run, or any other component of a device or system that can be identified, accessed, and/or controlled.

Messaging system 102 may further be configured to interact with any application programming interface (API). Each API may also be assigned or otherwise provided with a unique identifier (e.g., a distinct UUID) and/or a security token. Assigning APIs with a unique identifier enables messaging system 102 to receive instructions from and provide instructions to any IoT device, other device or machine, and/or system that is connected to the messaging system 102. Further details describing how the messaging system 102 can interact with any API of any device or system are described herein. By being able to interact with any API, messaging system 102 may control the functionality of all components of a registered IoT device, other device or machine, and/or system that are accessible by the messaging system 102. In some embodiments, messaging system 102 may be configured such that a single message transmitted by messaging system 102 may be communicated to multiple devices and/or systems having different APIs. Accessible IoT devices, other devices or machines, and/or systems include any device that has been registered with messaging system 102 and that has been assigned a unique identifier and/or a security token. For example, a user may purchase an IoT device. The user must register the IoT device with the messaging system 102, and may be assigned a UUID and security token by the messaging system 102 to make the IoT device accessible to the messaging system 102.

Using the common messaging system 102, people, devices, systems, and/or components thereof that have assigned UUIDs can query and communicate with a network of other people, devices, system, and components thereof that have assigned UUIDs and that meet specific search criteria. For example, a device may query the common messaging system 102 searching for a specific type of devices that are located in a particular area, and may receive a list of UUIDs for devices that meet the search criteria. The device may then send a message with a destination UUID assigned to the destination device to which the device wants to send a message.

In some embodiments, messaging system 102 may also detect, connect, and/or communicate with other servers, allowing messaging system 102 to route messages to IoT devices, other devices or machines, and/or systems on the other servers via a server-to-server connection. Server-to-server communications may include connections used to transfer data from one server to another server. For example, a user may use multiple cloud servers to store different types of information. A user may want to transfer data from a first server of a first cloud network to a second server of a second cloud network. A server-to-server communication allows the user to directly transfer or otherwise share this information with the second server. As another example, the messaging system 102 supports inter-cloud communications to allow people, devices or machines, systems, or components thereof to route messages across clouds to other people, devices or machines, systems, or components thereof on other clouds. For instance, a device connected to a private or public cloud network may send a message to another device connected to another private or public cloud.

IoT devices, other devices or machines, and/or systems may be able to connect with the messaging system 102 in several ways. In some embodiments, devices and systems may communicate with the messaging system 102 using a messaging system gateway. For example, IoT devices, other devices or machines, and/or systems may communicate with the messaging system 102 using messaging system gateway or hub 114. The messaging system gateway 114 may be connected to a same LAN as the devices that use the messaging system gateway 114. For example, the messaging system gateway 114 may be installed at a location, such as a home, office, a sports venue, an outside environment (e.g., a park, a city, or the like), or any other suitable location. In some embodiments, the messaging system gateway 114 includes an instance of messaging system software that is configured to interact with the messaging system 102. In some cases, the messaging system gateway 114 may be run on an operating system, such as, but not limited to, Linux™, Mac™ OS, and/or Windows™. In some embodiments, a messaging system gateway 114 may be a standalone physical device, such as a wireless router or modem, which runs the gateway software that connects to the messaging system 102 using a WAN. In some embodiments, a messaging system gateway 114 may be integrated into an IoT device, other device or machine, and/or system by installing the gateway software onto the IoT device, other device or machine, and/or system. For example, the messaging system gateway 114 may be run on computing devices such as a Raspberry Pi, a home and/or office computer, Intel™ Galileo, Beagle Bones, Yuns, and/or other suitable computing device.

Regardless of physical form, the messaging system gateway 114 may operate as an intermediary between the messaging system 102 and the devices or systems that use the messaging system gateway 114. For example, IoT devices, other devices or machines, and/or systems may be connected to messaging system gateway 114, which then links the IoT devices, other devices or machines, and/or systems to the messaging system 102 in real-time. The connection of a device or system to the messaging system 102 via the messaging system gateway 114 allows connected IoT devices, other devices or machines, and/or systems to communicate with one another in real-time. IoT devices, other devices or machines, and/or systems may be connected to messaging system gateway 114 using one or more native connection protocols of the IoT device, other device or machine, and/or system. The protocols may include, but are not limited to, Transmission Control Protocol (TCP), User Datagram Protocol (UDP), WiFi, ZigBee, Bluetooth low energy (BLE), HTTP, websockets, MQTT, CoAP, XMPP, SNMP, AllJoyn, and/or any other suitable connection protocol. In some embodiments, messaging system gateway 114 may broadcast a private network signal such that registered devices and systems may securely connect to the messaging system gateway 114 and to the messaging system 102. Devices and systems that do not have access to the messaging system gateway 114 and messaging system 102 may be unable to process the private network signal.

In some embodiments, messaging system gateway 114 is on a LAN side of a firewall, such as a network address translations (NAT) firewall implemented using a router, or other suitable firewall. In some cases, the messaging system gateway 114 may use websockets to connect to the messaging system 102. The connection between websockets of the messaging system gateway 114 and the messaging system 102 may include a bi-directional persistent connection. The bi-directional persistent connection may auto-reconnect as WAN (e.g., Internet, or the like) connectivity becomes available. By locating the messaging system gateway 114 inside of the firewall, only communications to and from the messaging system gateway 114 have to be granted access to the firewall. Accordingly, the messaging system 102 and any system and/or device connected to the messaging system gateway 114 may communicate through the firewall via the messaging system gateway 114. The messaging system gateway 114 may be used by a person or business to connect various IoT devices, other devices or machines, and/or systems to the messaging system 102, serving as a secure connection for communicating with messaging system 102 much like a personal firewall.

Devices and systems may also be able to communicate with the messaging system 102 using a mobile messaging system gateway that is installed on a mobile device. For example, IoT devices, other devices or machines, and/or systems may be able to connect with the messaging system 102 using a mobile gateway 118. The mobile gateway 118 is similar to a messaging system gateway 114, but instead is installed and operated on a mobile device. For example, mobile gateway 118 may be installed on a mobile phone, tablet, laptop, wearable device, or other suitable mobile device. The mobile gateway 118 may allow the mobile phone to connect to the messaging system 102. The mobile gateway 118 may access all sensors on the mobile device. For example, geolocation sensor data, compass headings, and/or accelerometer data of a mobile phone may be provided to the messaging system 102 through mobile gateway 118. In some embodiments, the mobile gateway 118 may be installed in wearable technology, such as pedometers, headsets, watches, and the like, as well as in Bluetooth™ low-energy devices. In some embodiments, the mobile gateway 118 may also provide a personal area network (PAN) and may allow other devices that are connectable to the mobile device to connect to the messaging system 102 via the mobile gateway 118. For example, one or more devices that do not have an Internet Protocol address and that are not able to connect to a LAN (e.g., a WiFi network or the like) may connect to the mobile gateway 118 using a wired interface or a short-range communication protocol interface, such as Bluetooth, BLE, Zigbee, near field communication (NFC), radio frequency (RF), infrared (IR), or any other suitable communication protocol. These devices may then connect to messaging system 102 through the mobile gateway 118 of the mobile device. The mobile gateway 118 may operate to exchange communications between the devices and the messaging system 102. Devices that do not have an Internet Protocol address and that are not able to connect to a local area network may include wearable technology or other similar devices that only have access to a PAN.

In some embodiments, an IoT device, other device or machine, and/or system may connect with messaging system 102, the messaging system gateway 114, and/or the mobile gateway 118 using a universal messaging system interface 116 that is programmed into the device or system. The built-in universal messaging system interface 116 (or universal interface 116) allows a device or system to perform operations that native firmware of the device or system does not allow it to perform. For example, the messaging system interface 116 may override the native firmware of a device to allow the device to perform various operations that are outside of the functionality of the native firmware. In some embodiments, the messaging system interface 116 may be installed on a device that does not have the ability to communicate with other devices using one or more connection protocols. In such embodiments, the messaging system interface 116 may provide the device with the capability to use one or more connection protocols. The messaging system interface 116 may access one or more sensors, inputs, outputs, or programs on the device or system in order to perform various operations. For example, the messaging system interface 116 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the device or system is able to run, or any other component of a device or system that can be identified, accessed, and/or controlled.

In some embodiments, the built-in universal messaging system interface 116 may include an operating system that allows the device to communicate with the messaging system 102. Messaging system interface 116 may be installed on an IoT device, other device or machine, and/or system, such as a computing device. For example, the messaging system interface 16 may be installed on a Raspberry Pi board, an Arduino board, a microcontroller, a minicomputer, or any other suitable computing device.

In some embodiments, a device or system running the messaging system interface 116 may connect directly to messaging system 102. In some embodiments, a device or system running the messaging system interface 116 may connect to the messaging system 102 via the messaging system gateway 114 or the mobile gateway 118. The messaging system interface 116 run by the device or system may be assigned a UUID and a token. The messaging system interface 116 may connect to the messaging system 102 using the assigned UUID and token, and may await further instructions from the messaging system 102. In some embodiments, the messaging system 102 may act as a compute server that controls the messaging system interface 116. For example, messaging system 102 may activate and/or deactivate pins of the computing device running the messaging system interface 116, request sensor data from the computing device, and/or cause the messaging system interface 116 to perform other functions related to the computing device. In some embodiments, the messaging system interface 116 can be connected to a gateway (e.g., messaging system gateway 114 or mobile gateway 118), and the gateway may act as a compute server that controls the messaging system interface 116 in a similar manner as described above. In some embodiments, messaging system interface 116 may be a mobile operating system or application that is able to run on mobile device operating systems, such as iOS and Android™ operating systems.

Information from messaging system 102, including information transmitted to messaging system 102 by messaging system gateway 114, mobile gateway 118, and/or messaging system interface 116, may be transmitted to one or more data storage systems. For example, information about IoT devices, other devices or machines, and/or systems registered with the messaging system 102 may be transmitted to device directory 104 for storage. The information about the IoT device, other device or machine, and/or system may be stored in device directory 104 upon registration of the IoT device, other device or machine, and/or system. For example, information related to when the IoT device, other device or machine, and/or system comes online or offline may be stored in device directory 104.

In some embodiments, the device directory 104 may maintain various lists, such as whitelists and/or blacklists, that are associated with a unique identifier (e.g., a UUID) assigned a person, an IoT device, other device or machine, system, and/or component thereof. The use of whitelists and blacklists ensures that devices, systems, and users only have access to those UUIDs of IoT devices, other devices or machines, and/or systems for which permission has been granted. In one example, the device directory 104 may maintain a whitelist for a UUID assigned to a device. The whitelist includes a list or array of UUIDs assigned to devices or systems that are allowed access the device at various levels of access. For example, four levels of access to the device may be granted to other devices or systems, and a separate list or array may be maintained for each level of access. In this example, the whitelist for the device's UUID may include a list or array that includes UUIDs of devices or systems that may discover the device, a list or array of UUIDs of devices or systems that may send a message to the device, a list or array of UUIDs of devices or systems that may receive a message from the device, and/or a list or array of UUIDs of devices or systems that may configure the device. Other levels of access may also be granted, such as the ability of another device or system to subscribe to the device.

In another example, the device directory 104 may also maintain a blacklist for a UUID assigned to the device. The blacklist includes a list or array of UUIDs assigned to devices or systems that are denied access to the device at the various levels of access. In this example, the blacklist for the device's UUID may include a list or array that includes UUIDs of devices or systems that cannot discover the device, a list or array of UUIDs of devices or systems that cannot send a message to the device, a list or array of UUIDs of devices or systems that cannot receive a message from the device, and/or a list or array of UUIDs of devices or systems that cannot configure the device.

In some embodiments, the device directory 104 is queriable, such that a device, system, or user may be provided with a list and/or array of IoT devices, other devices or machines, and/or systems that fit requested search criteria. The messaging system 102 may access the device directory 104 upon receiving a query from a device, system, or user. Upon polling the device directory 104 according to the criteria specified in a query, the messaging system 102 may provide a device with a list or array of UUIDs assigned to IoT devices, other devices or machines, and/or systems that are currently online and that the device has access to according to the device's UUID and/or security token. The use of the whitelists and/or blacklists operates as a security feature, ensuring that devices, systems, and users only have access to other devices, systems, and users to which permission has been granted.

In some embodiments, sensor data from sensors of registered IoT devices, other devices or machines, and/or systems may be transmitted to sensor data storage 106. The sensor data may be streamed from a registered IoT device, other device or machine, and/or system through messaging system 102 in real-time. Sensor data storage 106 is queriable such that a user may poll sensor data storage 106 to receive data from specified sensors during a specified time period. A user may also be able to query the sensor data storage 106 for all available data from one or more sensors. In some embodiments, information from sensor data storage 106, as well as additional information from messaging system 102, may be transmitted to an analytics database 108. In some embodiments, analytics database 108 may not be queried by a user of the system 100. In other embodiments, analytics database 106 may be queried by a user of the system 100. The information stored in analytics database 108 may be accessible via a platform network 110.

In some embodiments, multiple servers or other systems may each operate an instance of software that includes the messaging system 102, thus creating multiple cloud servers and/or instances of messaging systems 102. In some embodiments, a particular instance of messaging system 102 may have its own UUID that allows the instance of messaging system 102 to connect to another instance of messaging system 102 to form a mesh network of messaging systems. Other networks and devices or machines may also be part of the mesh network, such as LANs and PANs and the devices or machines that are interconnected using the LANs and PANs. Each of the LANs and PANs can have their own unique UUID and/or token registered with the messaging system 102. The LANs and PANs are addressable using their unique UUID, and can also address other UUIDs around the world. Such a mesh network may allow messages and other payloads to be routed between devices across messaging systems 102. Accordingly, the messaging system 102 supports inter-cloud communications to allow people, devices or machines, systems, or components thereof to route messages across clouds to other people, devices or machines, systems, or components thereof on other clouds. Each of the cloud networks may run an instance of the messaging system 102. For instance, a device connected to a private or public cloud network may send a message to another device connected to another private or public cloud.

As described above, each person, device or machine, system (e.g., cloud network running an instance of the messaging system, a LAN, a PAN, or the like), or components thereof that is registered with the messaging system 102 is assigned a UUID. Each person, device or machine, system, or components thereof can be referenced by the messaging system using its UUID. Each of the UUIDs can discover other UUIDs (e.g., clouds, other networks, people, or devices or machines) using one or more queries, such as using multicast Domain Name System (MDNS) or API queries. In some embodiments, a UUID can connect to multiple networks thus forming a global mesh network including different networks (e.g., multiple cloud networks, LANs, PANs, or a combination of cloud networks, LANs, and/or PANs). A cloud network running an instance of messaging system may also be assigned an UUID and can route messages across cloud networks via inter-cloud communications using a routing paradigm. For example, a cloud network can send a message across cloud networks by sending the message with a route UUID_/UUID_2/UUID_3/UUID_4, with each UUID be assigned to a different cloud network. In some embodiments, the mesh network may route the message based on known connections.

Platform network 110 may include one or more analytics engines that may process the information received from the analytics database 108. The analytics engines may aggregate the received information, detect trends, and/or perform other analytics on the information. Platform network 110 may be communicatively coupled with a number of APIs 112 that are used to create, manage, identify, and/or communicate with functions of different IoT devices, other devices or machines, and/or systems. APIs may include, for example, sales analytics APIs, social media account and other third-party messaging account APIs, stock quote APIs, weather service APIs, other data APIs, mobile application APIs, and any other suitable API. For example, a Facebook™ or other social media message may use a messaging API to send SMS messages. Platform network 110 may use the messaging API to deliver a payload to a device or system configured to display a SMS message. A light API may be provided by a manufacturer of "smart" light bulbs. The platform network 110 would then use this light API to provide an output to turn a light bulb connected to the platform network 110 on or off. Platform network 110 is also in communication with messaging system 102 using the APIs of messaging system 102. Platform network 110 may interact with the IoT devices, other devices or machines, and/or systems connected through the messaging system 102 using UUIDs and/or security tokens.

The UUIDs and/or security tokens may be issued by the messaging system 102 and/or the platform network 110. In some embodiments, a user may register systems and/or devices with the messaging system 102. The platform network 110 may import or otherwise utilize any UUIDs and/or tokens issued by the messaging system 102 during the registration. In some embodiments, a user may register devices and/or systems with the platform network 110. The platform network 110 may issue UUIDs and security tokens to IoT devices, other devices or machines, and/or systems upon registration of the IoT device, other device or machine, and/or system. The UUIDs and security tokens are used to access the messaging system 102, as described above. In some embodiments, a user may register devices and/or systems with both the messaging system 102 and the platform network 110. Either messaging system 102 or platform network 110 may issue UUIDs and/or tokens. Registration with the non-issuing system or network creates a link or other association with the issued UUIDs and/or security tokens.

Platform network 110 may operate an application or other program that provides a designer graphical interface that allows a user to create a control system or flow. The designer graphical interface may allow the user to create a control system by dragging and dropping blocks that represent various devices and/or systems of the control system, inputs and/or outputs from the various devices and/or systems, and/or functions for controlling the devices and/or systems. Any IoT device, other device or machine, and/or system that is registered with platform network 110 may be configured to receive or transmit a message to any other IoT device, other device or machine, and/or system that is registered with platform network 110 using an appropriate control system designed using the designer graphical interface. Messages may be transmitted from one device or system to control operation of another device or system. For example, the platform network 110 may run control systems continuously, such that an input from a device or system may automatically cause an event to occur in a different location and/or by a different device or system. Such functionality, along with access to the data from analytics database 108, enables the platform network 110 to monitor a performance, behavior, and/or state of any IoT device, other device or machine, and/or system within the control system and to send a resulting message or payload to any other IoT device, other device or machine, and/or system in the control system based on the monitored performance, behavior, and/or state. In another example, the platform network 110 may run a control system designed using the designer graphical interface upon receiving a command, such as from a user or from another device or system. In some embodiments, the designer graphical interface operated by the platform network 110 may access any IoT device, other device or machine, and/or system connected to messaging system 102, including IoT devices, other devices or machines, and/or systems connected using the messaging system gateway 114, messaging system interface 116, and/or mobile gateway 118. This connection enables control systems created using the designer graphical interface to control output functions of devices and/or systems registered with the messaging system 102. For example, real-time monitoring of data at a remote location, such as performance of a machine or system, or of a person's health condition may be performed by the platform network 110.

The platform network 110 may also automatically provide messages or other outputs, including commands, to any of the registered IoT devices, other devices or machines, and/or systems based on processes performed on information received from IoT devices, other device or machine, and/or system. For example, sensor data may be received from an IoT device and processed by analytics systems of the platform network 110. Using artificial intelligence and/or machine learning within the platform network 110, the processed sensor data may be used to provide commands to another system or device connected to platform network 110.

In some embodiments, platform network 110 may be connected with messaging system 102 through a web-based design interface 120. Web-based design interface 120 may include similar functionality as the designer of platform network 110, but operates as a web-based application. Users may design control systems and flows on web-based design interface 120 and test the control systems prior to fully deploying a control system into platform network 110. Users may have access to all IoT devices, other devices or machines, and/or systems associated with messaging system 102 and/or platform network 110, although the processing functions available using the web-based design interface 120 are limited to those provided by a web browser. Web-based design interface 120 may act as a developer design tool that functions through the capabilities of the web browser. A user may then import the control system into platform network 110 for continuous operation of the control system.

Devices or machines, systems, or components thereof that are each assigned individual UUIDs may continuously stream data (e.g., sensor data) to the messaging system 102. The streamed data may be stored in device directory 104, sensor data storage 106, and/or to the analytics database 108. The streamed data from the UUIDs may be reacted upon in real-time. As described in more detail below, UUIDs or user control system or flow created using the platform network 110 can subscribe to other UUIDs streaming the data. Based on thresholds within the data, frequency of occurrence of certain data, or the occurrence of the data itself, events can be created that trigger messages to be exchanged between devices or machines and/or systems. For example, a photo sensor with an assigned UUID that senses a change in light may stream sensor data to the messaging system 102, and a control system created using the platform network 110 may indicate that anytime a change in light occurs, a light with an assigned UUID should be turned on or off. The control system may subscribe to the UUID of the sensor so that it can detect when a change in light occurs. When the control system senses a light change, it may trigger a message to be sent to the light in order to cause the light to change states (e.g., on or off). In some examples, the sensor data and message exchanges or other transactions may be streamed into the analytics database 108 for real-time, near real-time, and/or offline data analytics.

In some embodiments, UUIDs can subscribe to other UUIDs with or without tokens (provided security permissions allow it). Subscribing with the device's UUID with a token allow a person, device, or system to "spy" on the device's inbound and outbound communications in an eavesdropping mode. Subscribing without the device's token may only allow the subscribing device access to the messages broadcast by the device (provided security permissions allow it).

Figure 2:
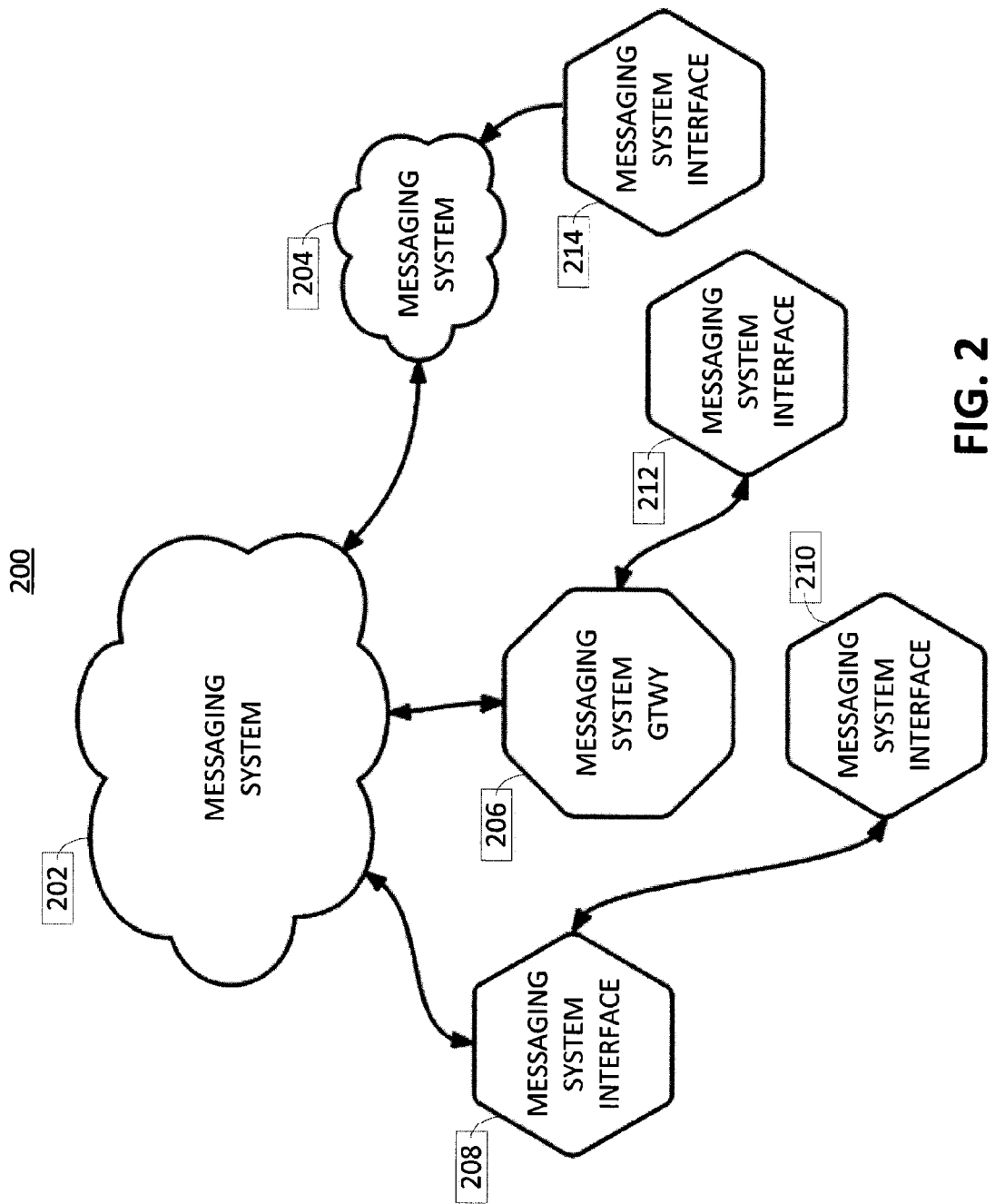
FIG. 2 is a system diagram illustrating an example of a system for exchanging machine-to-machine instant messages between systems and devices or machines, according to some embodiments.

FIG. 2 illustrates an example of a system 200 implementing various components of FIG. 1. The system 200 allows the real-time exchange of machine-to-machine instant messages between devices and/or systems. Network 200 includes a messaging system 202 and a messaging system 204. The messaging systems 202 and 204 may be similar to the messaging system 102 described above with respect to FIG. 1, and may perform one or more of the functions described above. Either of the messaging systems 202 and 204 may be part of a private or a public cloud network. For example, messaging system 202 may be part of a public cloud network with which any device, system, or user may be registered. Messaging system 204 may be part of a private cloud network that is restricted for use by only select devices, systems, or users. For example, the private messaging system 204 may be restricted for use by employees and affiliates of a particular company.

The system 200 may further include one or more messaging system interfaces implemented by one or more machines or devices. For example, the system 200 includes messaging system interface 208, messaging system interface 210, messaging system interface 212, and messaging system interface 214. The messaging system interfaces 208, 210, 212, 214 may be similar to the messaging system interface 116 described above with respect to FIG. 1, and may perform one or more of the functions described above. The messaging system interfaces 208, 210, 212, 214 may each be installed on a separate computing device and integrated with a separate machine or device. For example, the messaging system interfaces 208, 210, 212, or 214 may be installed on a computing device, such as a Raspberry Pi board, an Arduino board, a microcontroller, a minicomputer, or any other suitable computing device. The computing devices with the installed messaging system interfaces 208, 210, 212, or 214 may then be integrated with separate devices or machines. Accordingly, four machines may each be integrated with a computing device installed with one of the messaging system interfaces 208, 210, 212, and 214. Devices or machines can include any electronic device, including sensors and consumer products such as light bulbs, thermostats, home automation devices, smoke alarms, burglary alarms, an accelerator or other electronic component of a vehicle, a display device, a printer, or any other electronic device.

The system 200 may further include one or more messaging system gateways, including a messaging system gateway 206 and a mobile gateway (not shown). The messaging system gateway 206 may be similar to the messaging system gateway 114 described above with respect to FIG. 1, and may perform one or more of the functions described above. In some embodiments, the messaging system gateway 206 may include a mobile gateway, similar to the mobile gateway 118 described above with respect to FIG. 1. The messaging system gateway 114 may be connected to a local area network (LAN) and/or to a personal area network (PAN).

Any machine that has been assigned a unique identifier (e.g., a UUID) by the messaging system 202 or messaging system 204 and that has the ability to connect to a wide area network (WAN) (e.g., an IoT device) can connect directly to the messaging system 202. In some embodiments, only the messaging system 202 issues unique identifiers to people, machines or devices, systems, or components thereof. In such embodiments, the messaging system 204 may use the unique identifiers that are issued by the messaging system 202. In some embodiments, the messaging systems 202 and 204 are independent messaging systems, and each messaging systems 202 and 204 may issue different unique identifiers. Machines with or without unique identifiers can connect to the messaging system gateway 206. A machine with an assigned unique identifier and the appropriate access level permission can query the network 200 from anywhere in the world for other machines that meet a specific search criteria. The machine may message the other machines via the messaging system 202.

The messaging systems 202 and 204 support inter-cloud communications, allowing machines to route messages across the messaging systems 202 and 204 to devices and sub-devices on other cloud networks. For example, the machine running the messaging system interface 214 is connected to the private messaging system 204 cloud network, and can send a message to a machine running the messaging system interface 208 that is connected to the public messaging system 202. The machine running the messaging system interface 214 may be located in New York, N.Y., and the machine running the messaging system interface 208 may be located in London, England. The machine running the messaging system interface 214 may send the message to a route of UUIDs corresponding to the path that the message must follow in order to reach the machine running the messaging system interface 208. The route may be included in a routing list that is included in the message (e.g., in a field of the message, such as a header field). For example, the routing list for the message may include a route of UUIDs that includes UUID_MSGSYS204, UUID_MSGSYS202, and/or UUID_MSGSYSINT208. The messaging system 202 may assign the UUID_MSGSYS204 to the messaging system 204, the UUID_MSGSYS202 to itself, and the UUID_MSGSYSINT208 to the machine running the messaging system interface 208. The network servers of the messaging systems 202 and 204, the messaging system gateway 206, and the machines or devices running the messaging system interfaces 208, 210, 212, 214, if included in the route, may each remove their UUID from the routing list and pass the message on to the next UUID in the list until the message arrives at its destination. The same routing technique may be used to send messages within the same messaging system cloud network or across multiple messaging system cloud networks.

In some embodiments, devices or machines can also communicate with other devices or machines via one or more peer-to-peer sockets rather than going through a messaging system 202 or 204. For example, the machine running the messaging system interface 208 may directly communicate with the machine running the messaging system interface 210. One or more dynamic routing protocols may be used by the machines when exchanging communications via a peer-to-peer connection. In some embodiments, devices or machines may discover and be introduced to other devices or machines using the messaging system 202. After being introduced by the messaging system 202, the devices or machines may then begin a peer-to-peer communications session directly provided they have the proper security permissions. For example, the machine running the messaging system interface 208 may query the messaging system 202 for machines that meets certain criteria (e.g., Philips Hue™ light bulbs in a particular location, or other suitable search criteria). The messaging system 202 may check the security permissions of the machine running the messaging system interface 208, and may return a list or array of UUIDs assigned to machines that meet the criteria and for which the machine running the messaging system interface 208 has permission to access. One of the machines on the list or array may include the machine running the messaging system interface 210. The machines running messaging system interfaces 208 and 210 may then begin a peer-to-peer communications session to directly exchange messages.

In some embodiments, the messaging system 202 may store various properties of each registered person, machine or device, system, or component thereof that has an assigned UUID. Each registered person, machine or device, system, or component thereof may have a registry store in which the properties may be stored. For example, the registry store for each registered person, machine or device, system, or component thereof may be stored in a device directory similar to the device directory 104 described above. The properties can be anything that describes the person, machine or device, system, or component thereof, including status or state (e.g., on, off, idle, sleeping, or the like), type, color, features, connection protocols, geolocation, or the like. For example, one or more servers of the messaging system 202 may track how each registered machine or device is connected to the messaging system 202 or to a messaging system gateway (e.g., gateway 206). The messaging system 202 may also track the geolocation of each device or machine. For example, the messaging system 202 may store in a registry store for each machine or device the connection protocol used by each machine or device and the geolocation of each machine or device at a given point in time. The geolocation may be stored as a set of coordinates (e.g., global positioning system (GPS) coordinates, latitude-longitude coordinates, or the like). The connection protocol and the geolocation may be updated each time either changes. For example, if a machine or device changes locations or connects with the messaging system 202 using a different connection protocol, the messaging system 202 may update the machine's registry store with the updated connection protocol and/or geolocation. In some embodiments, the messaging system 202 can store all of the connection protocols for which a machine or device is configured to operate. The properties may be updated in real-time as the change occurs, or, in partial real-time at different points in time (e.g., every 1 minute, 2 minutes, 5 minutes, 30 minutes, 1 hour, or other appropriate period of time).

The messaging systems 202 and 204 operate using one or more native connection protocols. For example, the messaging systems 202 and 204 may natively recognize a HTTP connection protocol, a websockets connection protocol, a MQTT connection protocol, a CoAP connection protocol, an XMPP connection protocol, a SNMP connection protocol, an AllJoyn connection protocol, or any other appropriate connection protocol. One of ordinary skill in the art will recognize that the messaging systems 202 and 204 may natively operate using any other appropriate machine-to-machine connection protocol. Other protocols may be added to the messaging system 202 or 204 over time as the protocols become more universally used.

The messaging system 202 may also include a universal application programming interface that is available for use by all of the native connection protocols of the messaging system 202. The universal application programming interface may be used to interface Internet Things (IoT) devices that use different proprietary application programming interfaces. The universal application programming interface allows the messaging system 202 to avoid having to go through each machine's proprietary cloud network and proprietary application programming interface to facilitate message exchange between machines that use different proprietary protocols to communicate. Without a universal application programming interface, a server may receive a message from a first device that is destined for a second device. The first device may use a first proprietary connection protocol and application programming interface and the second device may use a second proprietary connection protocol and application programming interface. The server would have to send the message to the proprietary cloud server with which the second device is registered. The proprietary cloud server would then access the application programming interface used by the second device, and send the message to the second device. Such a procedure of sending the messages to a different proprietary cloud network using different application programming interface requests for each different proprietary protocol used adds latency to the message transport from the first device to the second device. Using the universal application programming interface, the messaging system 202 can receive messages from the first device, and can directly send the messages to the second device (or to a local gateway to which the second device is connected via a LAN or PAN) using a single application programming interface request.

The universal application programming interface supports various commands. For example, the universal application programming interface allows users, machines or devices, systems, or components thereof to get a status of the messaging system 202 (e.g., online, offline, temporarily offline, or the like). The universal application programming interface also allows a machine or device to be registered with the messaging system 202. Upon receiving a registration request, the universal application programming interface may return a UUID and a security token to the registrant. The universal application programming interface also specifies how queries from users, machines or devices, systems, or components thereof are handled. For example, the universal application programming interface may allow the messaging system 202 to return a list of UUIDs that correspond to a query for different users, machines or devices, systems, or components thereof. As another example, the universal application programming interface may allow the messaging system 202 to return information related to a specific machine or device in response to a query for information relating to the machine or device. The universal application programming interface also describes how to update features of (e.g., change a location, connection protocol, color, or other feature) or control (e.g., turn on/off, move to a different location, or the like) registered machines or devices in response to requests from users, machines or devices, systems, or components thereof to make the changes (and that have permission to do so). One of ordinary skill in the art will appreciate that the universal application programming interface can specify to the servers of the messaging system 202 how to perform various generic functions that relate to any connected users, machines or devices, systems, or components thereof.

One or more computing devices of the messaging system 202 can route messages to and from any connected machine or device in any supported protocol (whether native or transformed by a plug-in, as described below). The computing devices may include one or more network servers. The messaging system 202 may translate between the different native connection protocols to facilitate message exchanges between machines or devices that operate using different connection protocols. For example, the common messaging system may translate a received communication that is in a first native connection protocol to a second native connection protocol before sending the communication to a machine or device that only operates using the second native connection protocol or that operates using a connection protocol that is different than the first and second native connection protocols (in which case a plug-in would be needed to convert from the second native connection protocol to the protocol that the machine uses). In one example, a MQTT device can use the messaging system 202 to communicate a message to a CoAP device, a websocket-powered device, or a web page via HTTP. The messaging system 202 can thus interpret or translate the message to the destination device's connected or preferred connection protocol.

The messaging system 202 may be connected with the messaging system gateway 206, which then be used to bridge communication between the messaging system 202 and an IoT device that is coupled with the messaging system gateway 206. In some embodiments, the messaging system gateway 206 may include one or more messaging system plug-ins. In some embodiments, one or more plug-ins may be installed on one or more computing devices, such as a microcontroller, a minicomputer, or any other suitable computing device in the messaging system gateway 206. In some embodiments, one or more plug-ins may be added to one or more existing programs of the messaging system gateway 206. In some examples, each plug-in may include program code that knows how to interact with the messaging system gateway 206. For example, a plug-in may include a JavaScript piece of code. In some examples, when sending messages from a machine to the messaging system 202, a messaging system plug-in may translate or convert one or more connection protocols that are used by the machine and that are not native to the messaging system 202 to a native connection protocol of the messaging system 202. When sending messages from the messaging system 202 to the machine, the messaging system plug-in of the gateway 206 may also translate the native connection protocols of the messaging system 202 to the protocols used by the machine. In some examples, a messaging system plug-in may also translate or map one or more proprietary application programming interfaces used by a machine to a universal application programming interface of the messaging system 202. Similar plug-ins may be used in a mobile gateway (e.g., mobile gateway 118), and may perform similar functions as those described herein. For example, a mobile gateway may allow a user to interconnect various devices worn or carried by the user via a PAN provided by the mobile gateway, as described above. One or more plug-ins of the mobile gateway may allow the devices to communicate with the messaging system 202, similar to the plug-ins of the messaging system gateway 206.

To perform the translation, a plug-in may define a message schema that corresponds to the format of the messages required to communicate with a particular machine or device. For example, a message with a command from the messaging system 202 may instruct one or more machines to perform a function, such as to turn off all lights in a room. The message may be transmitted in a general format of the universal application programming interface that is not specific to the proprietary application programming interfaces of the different machines. The message may also be transmitted by the messaging system 202 using a connection protocol that is not used by the different machines. The proprietary application programming interfaces of the machines may only be configured to receive messages in a certain format, and the message from the messaging system 202 may not be in any of the specific formats. The one or more plug-ins that are used to translate messages for the different machine may translate the message into the format that is required by each of the proprietary application programming interfaces. The plug-ins may also transmit the message to the machines using the proprietary connection protocol for which the machines are configured to operate.

Accordingly, the messaging system gateway 206 supports an open plug-in architecture that translates non-native connection protocols, such as Phillips Hue™, Nest™, Belkin Wemo™, Insteon™, SmartThings™, or any other appropriate proprietary, legacy, or new connection protocols, to native protocols and/or to a universal application programming interface of the messaging system 202. In some cases, one or more of the machines or devices themselves may include a messaging system plug-in. Each machine or device that runs proprietary firmware and/or that uses proprietary application programming interfaces can include one or more plug-ins that translate the proprietary communications to and from the connection protocols used by the messaging system 202. The plug-in architecture allows proprietary, legacy (e.g., RS-232 serial, RF, or the like), and/or new machines or devices (e.g., BLE wearable devices or the like) to be registered with and communicate with the messaging system 202 regardless of the connection protocol natively used by the machines or devices.

The messaging system gateway 206 may include multiple plug-ins. For example, a set of machines or devices may be connected to the messaging system gateway 206. Different plug-ins may be used by different subsets of machines or devices that are connected to the messaging system gateway 206. The different subsets of machines may relate to different classes of devices. For example, machines may be broken into classes based on a manufacturer of the devices, a connection protocol and/or application programming interface used by the devices, or any other appropriate classification. Each of the devices that are connected to the messaging system gateway 206 may be assigned to a logical sub-device that the messaging system gateway 206 keeps track of. The messaging system gateway 206 may assign and map each logical sub-device to a particular plug-in. For example, the messaging system gateway 206 may store a record of all devices, with the record of each connected device including a separate sub-device and plug-in combination. In one example, three Philips Hue™ lights and two Nest™ smoke alarms may be connected to the messaging system gateway 206 for communicating with the messaging system 202. The messaging system gateway 206 may have a stored record for each device, including five records. The three records for the three Philips Hue™ lights may each include a separate sub-device (e.g., sub-device_A, sub-device_13, sub-device_C) and a plug-in that is specifically configured to translate between the messaging system 202 native connection protocols and application programming interfaces and the Philips Hue™ connection protocols and application programming interfaces. Similar records may be stored for the two Nest™ smoke alarms, including two records storing a separate sub-device for each smoke alarm (e.g., sub-device_D, sub-device E) and a plug-in that is configured to translate between the messaging system 202 native connection protocols and application programming interfaces and the Nest™ connection protocols and application programming interfaces. In some embodiments, the messaging system gateway 206 may include a single plug-in that is configured to and may translate between multiple proprietary connection protocols and application programming interfaces.

Working in combination, the messaging system 202 and the messaging system gateway 206 (and/or a mobile gateway) with the plug-ins allow machines or devices to communicate with one another regardless of the proprietary nature of the connection protocols or application programming interfaces that are used by the machines or devices. In the example above including the three Philips Hue™ lights and two Nest™ smoke alarms, a smoke alarm may communicate with one or more of the lights by sending messages to the messaging system 202 via the messaging system gateway 206. For example, when smoke is detected by the smoke alarm, the smoke alarm may transmit a message to the messaging system gateway 206 instructing all of the lights to turn on. A plug-in of the messaging system gateway 206 may translate the message from the proprietary Nest™ format to a generic, native format used by the messaging system 202. The messaging system 202 may determine a destination for the message by referring to one or more UUIDs that are included in the message. In some embodiments, the messaging system 202 may determine a destination based on a query included in the message. For example, the message may indicate that the message is to be sent to all lights that are located within a particular geolocation (e.g., within a certain distance from the smoke alarm). Once the messaging system 202 determines that the destination for the message includes the three lights, the messaging system 202 may process the message using the universal application programming interface. For example, the messaging system 202 may authenticate the smoke alarm using its UUID and token combination, and may determine the security permissions of the smoke alarm in order to verify that the smoke alarm has appropriate access to the lights (e.g., that the smoke alarm is permitted to discover and send messages to the lights).

As previously described, the system 200 also includes messaging system interface 208, messaging system interface 210, messaging system interface 212, and messaging system interface 214. The machines running the messaging system interfaces 208, 210, 212, 214 may directly connect with the messaging system 202 or may connect with the messaging system gateway 206 using the universal messaging system interfaces 208, 210, 212, 214. In some embodiments, the machine running the messaging system interface 208 may be a closed-network machine that is designed to communicate with a proprietary network in order to transmit and receive communications to other machines that operate using the same proprietary protocols. The messaging system interface 208 allows the machine to communicate directly with the messaging system 202 without going through the proprietary network. By communicating directly with the messaging system 202, the machine can communicate with any machine registered with the messaging system 202 regardless of the proprietary nature of the other machines. In some embodiments, the messaging system interfaces 208, 210, 212, or 214 may be an operating system that allows the machine running the messaging system interface 208, 210, 212, or 214 to communicate with the messaging system 202.

The built-in universal messaging system interfaces 208, 210, 212, 214 allow the machine running the universal messaging system interfaces 208, 210, 212, 214 to perform operations that native firmware of the machines does not allow them to perform. For example, the messaging system interface 210 may override the native firmware of its machine to allow the machine to perform various operations that are outside of the functionality of the native firmware. In some embodiments, the messaging system interface 210 may be installed on a machine that does not have the ability to communicate with other machines using one or more connection protocols. In such embodiments, the messaging system interface 210 may provide the machine with the capability to use one or more connection protocols. The messaging system interfaces 208, 210, 212, 214 may access one or more sensors, inputs, outputs, or programs on the machines running them in order to perform various operations. For example, the messaging system interface 212 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the machine is able to run, or any other component of the machine that can be identified, accessed, and/or controlled.

The messaging system interfaces 208, 210, 212, 214 may each be assigned a different UUID and token. The messaging system interfaces 208, 210, 212, 214 may connect to the messaging system 202 using the assigned UUID and token, and may await further instructions from the messaging system 202. In some embodiments, the messaging system 202 may act as a compute server that controls the messaging system messaging system interfaces 208, 210, 212, 214. For example, messaging system 202 may activate and/or deactivate pins of the machine running the messaging system interface 214, request sensor data from the machine, and/or cause the messaging system interface 214 to perform other functions related to the machine. In some embodiments, one or more of the messaging system interfaces 208, 210, 212, 214 can be connected to a gateway (e.g., messaging system gateway 206 or a mobile gateway), and the gateway may act as a compute server that controls the messaging system interfaces 208, 210, 212, 214 in a similar manner as the messaging system 202. In some embodiments, the messaging system interfaces 208, 210, 212, 214 may each be a mobile operating system or application that is able to run on mobile device operating systems, such as iOS and Android™ operating systems.

In one example of using one or more messaging system interfaces, a computing device may be provided. The computing device may include a Raspberry Pi board, an Arduino board, a microcontroller, a minicomputer, or any other suitable computing device. The computing device may be built into or integrated with a first device to allow the first device to communicate with other devices. For example, the computing device includes a messaging system interface (or "universal interface") for enabling one or more sensors of the first device to communicate with one or more sensors of a second device by connecting the one or more sensors with a network server of the messaging system 202. The first device and the second device may be in different locations, such as different rooms of a building, cities, countries, or continents. The first device may include a solar panel located on a roof of a building, and the second device may include a dimmable light bulb located in a room of the building.

The proprietary protocol and native firmware of the first device and the proprietary protocol and native firmware of the second device may not allow the devices to exchange communications with each other or with the messaging system 202. The universal interface allows the first device to communicate with the messaging system 202 in order to exchange communications with the second device. The universal interface is configured to and may obtain sensor data from a sensor of the first device. For example, the universal interface may obtain sensor data from the solar panel indicating that it is getting dark outside of the building. The amount of sunlight being received may fall below a certain threshold level as measured by an amount of current being generated by the solar panel using the received sunlight. The universal interface may cause a transmitter of the first device to transmit the sensor data to a network server of the messaging system 202, which may include a cloud network. The universal interface thus allows the first device to transmit sensor data to the messaging system 202 even when the proprietary protocol or firmware of the first device does not allow the one or more sensors of the first device to communicate with other devices. In some embodiments, the universal interface may transmit the sensor data to a messaging system gateway on a LAN and/or a PAN with which the universal interface can communicate.

The universal interface may further receive a command from the messaging system 202. The command may be received when a sensor of the second device senses a condition. For example, the light may include a photodiode that can sense light. The photodiode may sense natural light, and in response may transmit a message to the messaging system 202 (e.g., using a universal interface installed on the dimmable light) to query whether the solar panel senses sunlight. In this example, the solar panel may have incorrectly determined that it was getting dark in response to the sun going behind a cloud. The command received by the universal interface may cause the sensor of the first device to perform a function. For example, the solar panel may check the amount of current being produced based on the current amount of sunlight being received. The first device may then send a command to the messaging system 202 with updated sensor data.

In some embodiments, the universal interface is configured to and may determine a first universally unique identifier assigned to the sensor of the first device, determine a second universally unique identifier assigned to a sensor of the second device, and cause the transmitter to transmit the first universally unique identifier and the second universally unique identifier with the sensor data to the network server. Accordingly, the network server of the messaging system 202 may determine to which device and sensor to transmit the message, and may determine the security access permissions of the first device sensor.

In another example, a universal messaging system interface installed on a device may allow multiple sensors within the device to interact in a way that the sensors were not designed to operate. For example, a device may include a thermostat. The thermostat may include a motion sensor that is designed to turn on a LED display when motion is detected. The thermostat may also include a controller that controls the temperature of an air conditioning system. The native proprietary protocol and firmware of the thermostat is not designed to allow the motion detector to be used except to send signals to turn on the LED display as motion is detected. For example, the native proprietary protocol and firmware of the thermostat may not allow the motion sensor and the controller to communicate with one another. The thermostat may be integrated with a computing device (e.g., a Raspberry Pi board, an Arduino board, a microcontroller, a minicomputer, or any other suitable computing device) that has a universal messaging system interface installed on it. The universal messaging system interface allows the sensors of the thermostat to communicate with the messaging system 202. For example, the motion sensor and the controller may be assigned separate UUIDs and tokens. The universal messaging system interface may stream motion data from the motion sensor to the messaging system 202. The messaging system 202 may perform one or more functions based on the motion data. For example, the messaging system 202 may include a program that sends a message to the controller anytime motion is detected by the motion sensor. The program may be created by a user of the thermostat using the designer graphical interface implemented by the platform network 110 or the design interface 120 described above. The program may be stored in the messaging system 202, and may access the motion data and convert motion sensor values to a command that is included in the message. The command may instruct the controller to turn the temperature of the air conditioning system to 72 degrees. Accordingly, sensors of the thermostat that are not designed to communicate with one another can exchange messages using the messaging system and the messaging system interface.

Users may search for IoT objects by communicating messages to a messaging system, such as messaging system 102, 202, 204, 314, 414, or 514. The messages may establish search parameters, which may specify any type of feature of an IoT object. The messaging system may return a list of IoT objects matching some or all of the search parameters, such as by returning a list of UUIDs of IoT objects that meet the parameters. The objects may connect and interact with one another using the messaging system. In some embodiments, the objects may read, write, and/or control information and components of other objects.

Searches for IoT devices to connect with may be conducted based on location. For example, an input may be received by a messaging system from a first IoT device that defines a location range within which to search for IoT devices. The input may include one or more additional criteria beyond just the location of the IoT device. For example, criteria may include a type of a device and/or a status of the device, as well as any number of other criteria. The messaging system may then determine whether there are any IoT devices within the defined location range and provide one or more of these detected IoT devices to the first IoT device.

Figure 3:
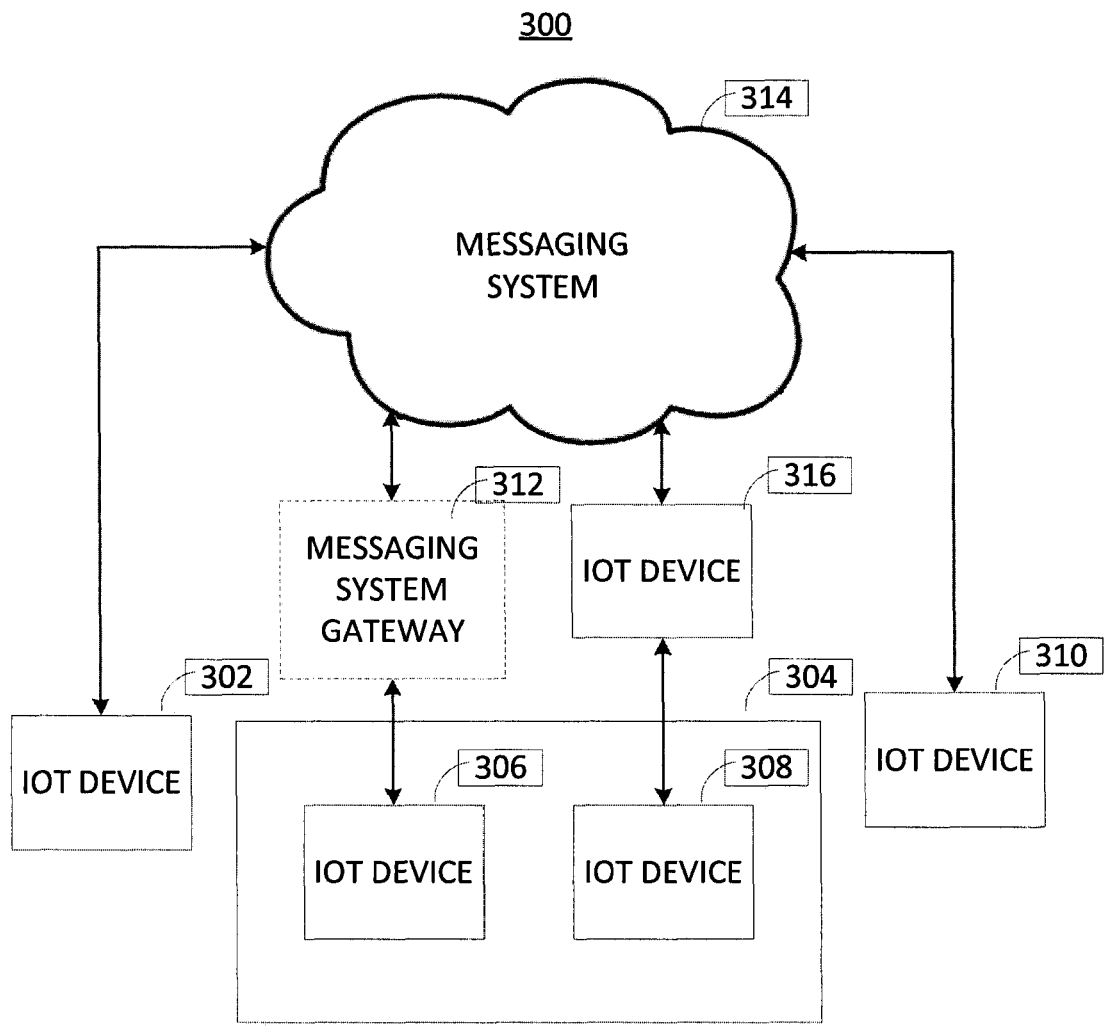
FIG. 3 is a system diagram illustrating an example of a system for facilitating a location-based search for an Internet of Things (IoT) device, according to some embodiments.

FIG. 3 illustrates an example of a system 300 for facilitating a location-based search for an IoT device. A first IoT device 302 may send a communication to a cloud computing messaging system 314. The communication is received by the messaging system 314 using a connection protocol, such as a protocol native to the first IoT device 302. In some embodiments, the messaging system 314 may be a network server of a messaging system (e.g., messaging system 102, 202, 204, 414, or 514). The communication may include a location query. The location query may include a search range 304, such as a geofence, a specific location, a search radius, an altitude, and/or an altitude range within which to search for other IoT devices. A geofence may include one or more boundaries that define a virtual perimeter for an area. In some embodiments, a geofence may be drawn, mapped, and/or otherwise laid out based on receiving input criteria for determining a boundary and/or by receiving an input having a boundary provided by a user device, such as a boundary drawn on a map application. Specific locations used as search ranges 304 may include buildings, landmarks, and/or other locations, and may be defined by an address and/or a geographic coordinate system. In some embodiments, the specific locations may include a search radius, which increases the likelihood that a device proximate to the specific location may be detected. Search radii may be predetermined by the messaging system 314 and/or first IoT device 302, and/or may be determined by an input received by the messaging system 314 and/or first IoT device 302, such as an input provided by a user of the first IoT device 302. Search radii may be as small as a few inches or as large as many miles and may be tailored to fit the needs of a particular application.

Altitudes used as search ranges 304 may be defined by an altitude above and/or below sea level or by using some other absolute or relative scale of elevation or altitude. In some embodiments, the altitude may include an altitude range, which increases the likelihood that a device proximate to the altitude may be detected. Altitude ranges may be predetermined by the messaging system 314 and/or first IoT device 302, and/or may be determined by an input received by the messaging system 314 and/or first IoT device 302, such as an input provided by a user of the first IoT device 302. Altitude ranges may be as small as a few inches or as large as many miles and may be tailored to fit the needs of a particular application. In some embodiments, the search range 304 may be three-dimensional, and include both an altitude range and location range. For example, the search range 304 may include a search radius defined by a an area centered around a geographic coordination. The search range 304 may also include an altitude range that specifies endpoints of altitudes and/or elevations between which to search for IoT devices. This may be especially useful if trying to tracking IoT devices on aerial vehicles and/or marine vehicles, such as submarines.

The search ranges 304 may include distances, radii, and/or altitude ranges as small as one or two feet or as large as several thousand miles, or may be distinct positions. One of ordinary skill in the art would appreciate that any appropriate distance or range may be used. The precision of the ranges may be determined and/or limited by the position sensing technology utilized. A geofence may be defined by an input received by the first IoT device 302. For example, a user may specify a perimeter of geographic coordinates, draw a boundary onto a mapping application, and/or otherwise designating a perimeter or polygon that defines a search area. These defined boundaries may be converted into geographic coordinates by the mapping application, first IoT device 302, and/or using the messaging system 314. Geofences may be particularly useful when flows or control systems require specific parameters to occur. In one example of using a geofence, a user may outline all or part of their property using the first IoT device and construct a flow that instructs a particular device to react to the user's presence. The user may specify that when he enters his driveway (as determined by the location of an IoT device, such as a fob in the user's automobile) the garage door will open. If the user parks in the street, the garage remains closed. The search range may have a default value or may be defined by the communication received from the first IoT device 302. Here, the search range 304 does not include the present location the first IoT device 302, but in some embodiments, the search range 304 may be centered around and/or otherwise include the location of the first IoT device 302. A geofence may also be used to define a search range 304 for finding additional IoT devices.

The messaging system 314 may determine a second IoT device 306 having a location that matches the location query. For example, the messaging system 314 may poll a database, such as device directory 104 of FIG. 1, of IoT devices to find one or more of the IoT devices at the location that matches the location query. The messaging system 314 may also locate one or more IoT devices that have not been registered with the messaging system 314 and/or device directory 104. Hubs, such as mobile gateway 118 and/or messaging system gateway 114, may detect devices that are not and/or have not yet been connected to the messaging system 314, but that are connectable to the messaging system 314. Devices having locations not matching the search range 304 of the location query, such as a IoT device 310, are not returned in a list of search results. As another example, determining the second IoT device 306 may include detecting any IoT device that is connectable directly or indirectly with the cloud computing messaging system 314. Directly connectable IoT devices often connect using a messaging system interface, such as messaging system interface 116 of FIG. 1. Indirectly connectable IoT devices may include those devices connectable using a messaging system gateway and/or a mobile gateway, such as messaging system gateway 114 or mobile gateway 118 of FIG. 1. Indirectly connectable IoT devices may also be IoT devices connected to the messaging system 314 using another IoT device that is connected to the messaging system 314, such as third IoT device 308 which is connected to the messaging system 314 using IoT device 316.

The location of the second IoT device 306 and/or any other IoT devices may be detected using one or more of a geo-Internet Protocol, a global positioning satellite sensor of the second IoT device, altimeter, and/or other location sensor of the second IoT device 306 and/or any other IoT devices.

In some embodiments, the communication from the first IoT device 302 may include additional criteria for a second IoT device 306. For example, features of the second IoT device 306, characteristics of the second IoT device 306, a status of the second IoT device 306, a type of the second IoT device 306, and/or other criteria may be used to broaden or narrow the scope of the search resulting from the communication from the first IoT device 302. The criteria may include any feature, component, and/or functionality of an IoT device.

The messaging system 314 may transmit information to the first IoT device 302. The information may be related to the second IoT device 306, and may be transmitted using the first connection protocol. For example, the information transmitted to the first IoT device 302 may include a UUID associated with the second IoT device 306. This provides the first IoT device 302 with an identifier by which to address messages to the second IoT device 306 by relaying information via the messaging system 314. The messaging system 314 may receive a transmission from the first IoT device 302 for the second IoT device 306 using the first connection protocol. The UUID may be useable to direct the message to the second IoT device 306. In some embodiments, the second IoT device 306 may utilize a connection protocol different from the connection protocol of the first IoT device 302. The messaging system 314 may translate the transmission from the connection protocol of the first IoT device 302 to the connection protocol of the second IoT device 306. The messaging system 314 may then communicate the translated transmission to the second IoT device 306 using the connection protocol of the second IoT device 306.

In some embodiments, the messaging system 314 may determine a third IoT device 308 having a location matching the location query, and wherein the third IoT device is connectable using a third connection protocol. The messaging system 314 may transmit additional information to the first IoT device 302. In some embodiments, the additional information may be related to the third IoT device 308. The additional information may be transmitted to the first IoT device 302 using the connection protocol of the first IoT device 302.

In some embodiments, one or more of the IoT devices, such as second IoT device 306, may communicate with the messaging system 314 via a messaging system gateway 312. However, the second IoT device 306 may communicate directly with the messaging system 314 using the messaging system interface. The messaging system gateway 312 is illustrated in FIG. 3 with dotted lines to indicate the optional nature of the messaging system gateway 312.

As one example, system 300 may be used for searching for an IoT device, such as a drone, to communicate with and/or control. For example, a user with a first IoT device may communicate a search request to a messaging system looking for an unmanned aerial vehicle or other remotely controllable robotic device that is located within a certain area. The user may specify additional criteria, such as that the unmanned aerial vehicle has an active or on status, and that it is capable of performing a particular task, such as taking a video with sound. The criteria may include any feature, component, and/or functionality of an IoT device. The messaging system may produce a list of one or more IoT devices within the area that meet the criteria. The messaging system may also produce a list of unmanned aerial vehicles that are in the area and meet some of the criteria and/or that offer reasonable alternatives. For example, a list may include ten unmanned aerial vehicles that are in the searched area, ten of which are on, and four of those have the desired functionality and/or other characteristics. The list may further show three unmanned aerial vehicles that may still serve the desired purpose, but that do not meet some or all of the search criteria. The user may then select one of the unmanned aerial vehicles provided by the messaging system and communicate with the unmanned aerial vehicle using the first IoT device. In some embodiments, the list of IoT devices may contain a list of UUIDs that have been registered with the messaging system 314. The UUIDs are used to identify the IoT devices and used by the messaging system 314 to route any communications from one IoT device to another IoT device. In some embodiments, the list of IoT devices may include one or more IoT devices that has not yet been registered with messaging system 314, but is still detectable, such as by being connected to an intermediate IoT device that is registered with the messaging system 314.

Searches for IoT devices to connect with may be conducted for devices that are located within a defined proximity of the searching IoT device. For example, an input may be received by a messaging system from a first IoT device that defines a detection radius range within which to search for IoT devices. The detection range may be determined based on a connection protocol of the searching IoT device and/or may be determined based on a defined radius received from the searching IoT device, such as a radius set by a user of the searching IoT device. The input may include one or more additional criteria beyond just the location of the IoT device. For example, criteria may include a type of a device and/or a status of the device, as well as any number of other criteria. The messaging system may then determine whether there are any IoT devices within the detection radius and provide one or more of these detected IoT devices to the first IoT device.

Figure 4:
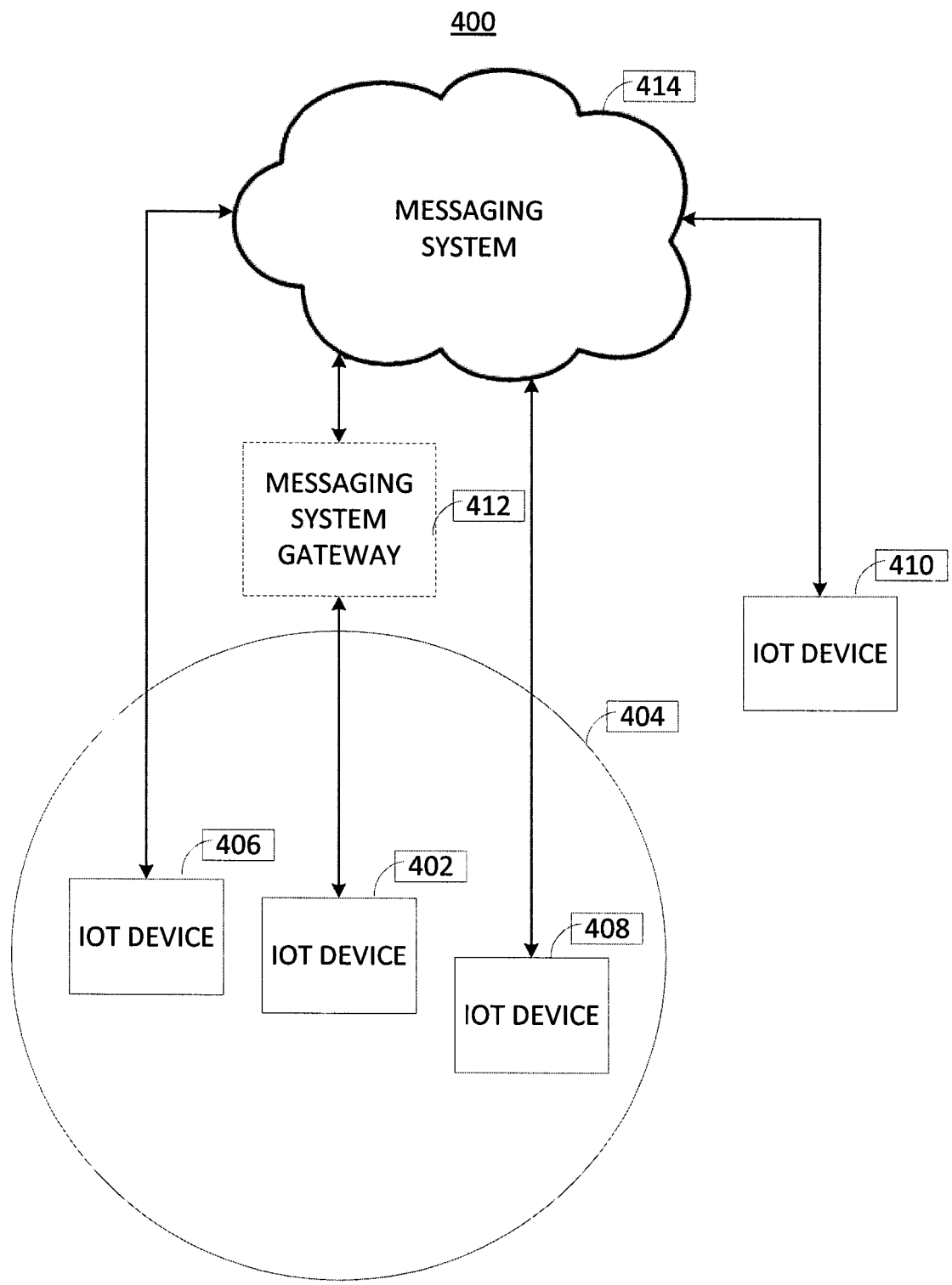
FIG. 4 is a system diagram illustrating an example of a system for facilitating the detection of an Internet of Things (IoT) object within the proximity of another IoT device, according to some embodiments.

FIG. 4 illustrates an embodiment of a system 400 for facilitating the detection of an IoT object within the proximity of another IoT device. A first IoT device 402 may send a communication to a cloud computing messaging system 414. The communication is received by the messaging system 414 using a connection protocol, such as a protocol native to the first IoT device 402. In some embodiments, the messaging system 414 may be a network server of a messaging system (e.g., messaging system 102, 202, 204, 314, or 514). The communication may include a detection radius 404 of the first IoT device 402. The detection radius 404 may be a connection range of the first connection protocol. For example, the first protocol may be a Bluetooth™ protocol used by the first IoT device 402 to broadcast a Bluetooth™ signal. The detection radius may extend as far out as the Bluetooth™ signal broadcast by the first IoT device 402. In other embodiments, such as those using very long range wireless, cellular, and/or wired network connection protocols, the detection radius may be a specified distance from the first IoT device 402. The specified distance may be a default radius selected by the first IoT device 402 and/or the messaging system 414, or the specified distance may be set by a user of the first IoT device 402.

The messaging system 414 may determine a second IoT device 406 based on the second IoT device 406 being located within the detection radius 404 of the first IoT device 402. For example, the messaging system 414 may poll a database, such as device directory 104 of FIG. 1, of IoT devices to find one or more of the IoT devices within the detection radius 404. Devices outside of the detection radius 404, such as a fourth IoT device 410, are not returned in a list of search results. As another example, determining the second IoT device 406 may include detecting any IoT device that is connectable directly or indirectly with the cloud computing messaging system 414. Directly connectable IoT devices often connect using a messaging system interface, such as messaging system interface 116 of FIG. 1. Indirectly connectable IoT devices may include those devices connectable using a messaging system gateway and/or a mobile gateway, such as messaging system gateway 114 or mobile gateway 118 of FIG. 1. Indirectly connectable IoT devices may also be IoT devices connected to the messaging system 414 using another IoT device that is connected to the messaging system 414.

The location of the second IoT device 406 and/or any other IoT devices may be detected using one or more of a geo-Internet Protocol, a global positioning satellite sensor of the second IoT device 406, altimeter, and/or other location sensor of the second IoT device 406/or any other IoT devices. In some embodiments, the communication is received by messaging system 414 upon the first IoT device 402 reaching one or more of a specified altitude, a specified destination, and/or a specified time. For example, a first IoT device 402 in transit, such as a part of a vehicle or a device being transported on a vehicle, may send a communication searching for additional IoT devices upon reaching a time, location, and/or altitude based checkpoint. As one example, a user may want to know when an airplane is due to arrive and provide an input to a first IoT device where the input included a specified location or altitude. A first IoT device may receive an alert when a second IoT device that is located on the airplane arrives at a destination or checkpoint based on the specified location or altitude. The second IoT device may monitor its altitude and location and upon the location and altitude matching the specified altitude or location, the second IoT device may communicate the alert to the first IoT device. In other embodiments, one or more sensors of the first IoT device 402 may detect one or more conditions of the first IoT device 402, other objects, and/or the environment. The first IoT device 402 may send the communication upon one of the one or more sensors detecting a predetermined condition threshold. For example, the condition may include chemical, biological, radiation, temperature, pressure, humidity, weight, acceleration, sound, video, image, infrared, acceleration, strain, and/or other conditions.

In some embodiments, the communication from the first IoT device 402 may include additional criteria for a second IoT device 406 to match. For example, features of the second IoT device 406, characteristics of the second IoT device 406, a status of the second IoT device 406, a type of the second IoT device 406, a distance from the first IoT device 402, an altitude of the second IoT device 406, and/or other criteria may be used to broaden or narrow the scope of the search resulting from the communication from the first IoT device 402, although any searchable feature, component, and/or functionality of an IoT device may be used as criteria.

The messaging system 414 may transmit information to the first IoT device 402. The information may be related to the second IoT device 406, and may be transmitted using the first connection protocol. For example, the information transmitted to the first IoT device 402 may include a universally unique identifier associated with the second IoT device 406. This provides the first IoT device 402 with an identifier by which to address messages to the second IoT device 406 by relaying information via the messaging system 414. The messaging system 414 may receive a transmission from the first IoT device 402 for the second IoT 406 device using the first connection protocol. In some embodiments, the second IoT device 406 may utilize a connection protocol different from the connection protocol of the first IoT device 402. The messaging system 414 may translate the transmission from the connection protocol of the first IoT device 402 to the connection protocol of the second IoT device 406. The messaging system 414 may then communicate the translated transmission to the second IoT device 406 using the connection protocol of the second IoT device 406.

In some embodiments, the messaging system 414 may determine a third IoT device 408 within the detection radius of the first IoT device 402. The third IoT device 408 may be connectable using a connection protocol of the third IoT device 408. The messaging system 414 may transmit additional information to the first IoT device 402. In some embodiments, the additional information may be related to the third IoT device 408, such as a UUID of the third IoT device 408. The additional information may be transmitted using the connection protocol of the first IoT device 402.

In some embodiments, one or more of the IoT devices, such as first IoT device 402, may communicate with the messaging system 414 via a messaging system gateway 412. However, the first IoT device 402 may communicate directly with the messaging system 414 using the messaging system interface. The messaging system gateway 412 is illustrated in FIG. 4 with dotted lines to indicate the optional nature of the messaging system gateway 412.

In some embodiments, the proximity based search may return all IoT objects that are connected to the same network, such as a LAN, behind a private firewall, and/or that have the same public IP address. Additional criteria may be specified for such a search, as described above. Such local network searches may enable the easy configuration of an integrated office technology system, as IoT devices are easily discovered and connectable using the messaging system.

In some embodiments, proximity functionality of the first IoT device may be used in a two-factor authentication for systems, automobiles, homes, offices, and other secures areas. For example, the first IoT device may detect a second IoT device, such as a lock mechanism or key fob, within a connection range of the first IoT device. As a user must bring the first IoT device within range of the second IoT device, one level of authentication is provided. Additionally, a key code, a key, a fob, and/or other access medium may be required along with the communication between the first IoT device and the second IoT device.

In some embodiments, the proximity-based searching may be used to control a behavior mode of one or more IoT devices. For example, IoT devices may be put into a master/slave mode when near one another using a first connection protocol and connected in a mesh networking mode when the IoT devices are spaced apart a certain distance using a second connection protocol. In some embodiments, the first connection protocol and the second connection protocol may be the same, while in other embodiments the first connection protocol and the second connection protocol may be different. One such application may include driverless vehicles and/or unmanned aerial vehicles, where a group of vehicles and/or unmanned aerial vehicles may communicate with one another when in proximity with one another to organize and travel in a convoy. For example, a first vehicle in the convoy may serve as a master device and direct the subsequent vehicles as slave devices to maintain speeds, directions, distances from one another, and the like. If the vehicles in a convoy are spread far apart, the vehicles may communicate as a mesh network to relay messages between the various vehicles.

In some embodiments, suggested IoT devices with which a first IoT device may connect are provided. For example, a request may be received by a messaging system from a first IoT device to connect with a second IoT device. The messaging system may identify characteristics of the second IoT device, such as device type, status, locations, and the like. The messaging system may then determine whether there are any other IoT devices having similar or the same characteristics as the second IoT device. Any such devices may be provided to the first IoT device as suggested IoT devices to connect with. Suggested IoT devices may also be based on which other IoT devices the second IoT device is connected with.

Figure 5:
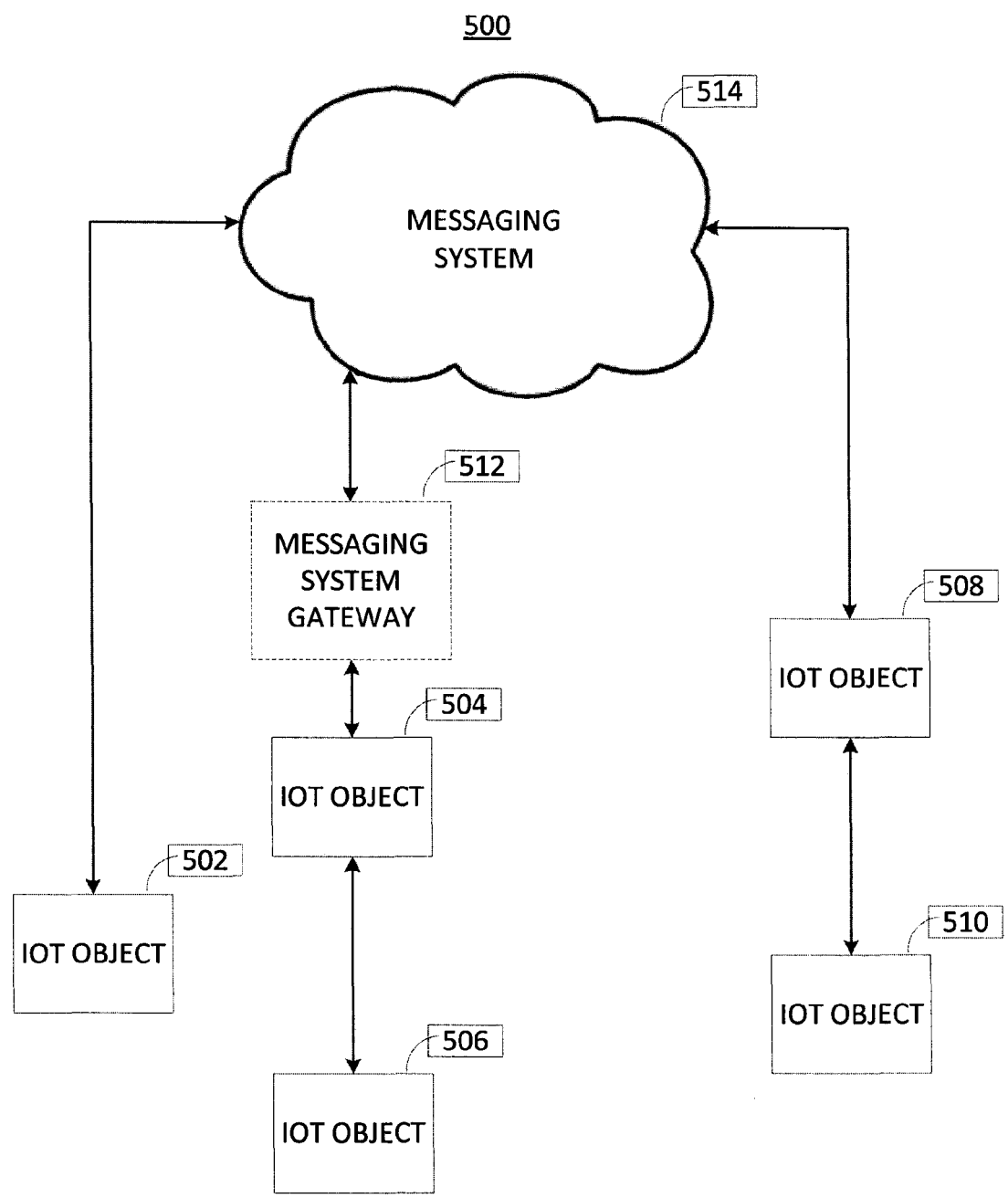
FIG. 5 is a system diagram illustrating an example of a system for providing suggested IoT object with which another IoT object can connect, according to some embodiments.

FIG. 5 illustrates an embodiment of a system 500 for providing suggested IoT object with which another IoT object can connect. A first IoT object 502 may send a communication to a cloud computing messaging system 514. The communication is received by the messaging system 514 using a connection protocol, such as a protocol native to the first IoT object 502. In some embodiments, the messaging system 514 may be a network server of a messaging system (e.g., messaging system 102, 202, 204, 314, or 414). The first IoT object 502 may be a first IoT device, a first third-party messaging account, or a first computing device. The communication may include a request to connect with a second IoT object 504. The second IoT object 504 may be a second IoT device, a second third-party messaging account, or a second computing device. Other searchable objects may include software APIs and/or flows and control systems.

The messaging system 514 may analyze a plurality of IoT objects against one or more characteristics of the second IoT object 504 to identify a suggested IoT object. Each of the plurality of IoT objects is connectable with the cloud computing messaging system 514. As one example, the one or more characteristics of the second IoT object may include an IoT object type, a location, features of the second IoT device 504, a status of the second IoT device 504, a type of the second IoT device 504, a distance from the first IoT device 502, an altitude of the second IoT device 504, and/or other criteria may be used to broaden or narrow the scope of the search resulting from the communication from the first IoT device 402 and/or functionality of the IoT object. The plurality of IoT objects is analyzed to identify any IoT objects matching one or more of these characteristics. Such IoT devices may be selected as suggested IoT objects. In some embodiments, the selected IoT object has a highest match score based on matching a greatest number of characteristics of the second IoT object. For example, a match score may be the total number of characteristics matched by an IoT device. If the match score surpasses a threshold value, the IoT device may be suggested to the first IoT device. For example, if a third IoT device matches five characteristics of the second IoT device and a threshold number is three, the third IoT device may be suggested to the first IoT device. It will be appreciated that any appropriate match score value may be used as the threshold value. To identify the plurality of IoT objects, messaging system 514 may poll a database, such as device directory 104 of IoT objects of FIG. 1, to find one or more of the IoT object matching one or more of the characteristics of the second IoT object 504. Devices not matching any of the characteristics, are not returned in a list of search results. In some embodiments, the suggested devices may not be stored on a database, but instead may be discovered through a connection of a mesh network. For example, the suggested device may be detected based on being connected to the first IoT object 502 using a mesh network or a device similar to first IoT object 502 using a mesh network. In some embodiments, the identification of a plurality of IoT objects may include both polling a database and detecting IoT objects through mesh networks connected to the first IoT object 502 and/or other IoT objects.

As another example, identifying the plurality of IoT objects may include detecting any IoT object that is connectable directly or indirectly with the cloud computing messaging system 514. Directly connectable IoT objects often connect using a messaging system interface, such as messaging system interface 116 of FIG. 1. Indirectly connectable IoT objects may include those objects connectable using a messaging system gateway and/or a mobile gateway, such as messaging system gateway 114 or mobile gateway 118 of FIG. 1. Indirectly connectable IoT objects may also be IoT objects connected to the messaging system 514 using another IoT object that is connected to the messaging system 514, such as fifth IoT object 510 that is connected with messaging system 514 using fourth IoT object 508.

The suggested IoT object may be a IoT object in direct communication with the messaging system, such as fourth IoT object 508. In some embodiments, the suggested IoT object may be connected with the messaging system 514 through an IoT object in direct connection with the messaging system 514, such as third IoT object 506 and/or fifth IoT object 510. The suggested IoT object may be selected based on having at least some of the same and/or similar characteristics as the second IoT object 504 and/or based on being one of a most frequently connected object among other objects connected to the second IoT object 504 and/or an object having similar characteristics as second IoT object 504. For example, the suggested IoT object may be identified based on a threshold number of IoT objects of other users with which the suggested IoT device is connected. For example, any IoT device connected to a number of other IoT devices that matches or exceeds the threshold number may be provided as a suggested IoT device. The threshold value may be five, ten, twenty, or any other appropriate number of users and/or devices. For example, the suggested IoT object may be an object most frequently connected to by other IoT objects that are also connected to second IoT object 504, other IoT objects connected to second IoT object 504 and/or IoT objects having at least a portion of the one or more characteristics of the second IoT object 504. In some embodiments, the suggested IoT may be selected based on a rating provided by users.

In some embodiments, the suggestions may be based, at least in part, on a number of subscribers listening to each IoT object. Information about the subscribers, such as demographic information and location information, may be collected and used to provide suggested IoT objects based on the subscribers being alike, different, located near, and/or located far from the user of the first IoT device.

The messaging system 514 may transmit information related to the suggested IoT object to the first IoT object 502 using the connection protocol. The information may include a universal unique identifier associated with the suggested IoT object. This provides the first IoT object 502 with an identifier by which to address messages to the suggested IoT object by relaying information via the messaging system 514. The messaging system 514 may receive a transmission from the first IoT object 502 for the suggested IoT object using the connection protocol, such as a request for communication with and/or control of the suggested IoT object. In some embodiments, the suggested IoT object may utilize a connection protocol different from the connection protocol of the first IoT object 502. The messaging system 514 may translate the transmission from the connection protocol of the first IoT object 502 to the connection protocol of the suggested IoT object. The messaging system 514 may then communicate the translated transmission to the suggested IoT object using the connection protocol of the suggested IoT object.

In some embodiments, the messaging system 514 may identify a second suggested IoT object and transmit additional information that is related to the second suggested IoT object to the first IoT object 502. The second suggested IoT object may be connectable using a connection protocol of the second suggested IoT object. The messaging system 514 may transmit additional information to the first IoT device 502. In some embodiments, the additional information may be related to the second suggested IoT object, such as a UUID of the second suggested IoT object. The additional information may be transmitted using the connection protocol of the first IoT device 502.

In some embodiments, one or more of the IoT objects, such as second IoT device 504, may communicate with the messaging system 514 via a messaging system gateway 512. However, the second IoT device 504 may communicate directly with the messaging system 414 using the messaging system interface. The messaging system gateway 512 is illustrated in FIG. 5 with dotted lines to indicate the optional nature of the messaging system gateway 512.

In some embodiments, a user may actively decline to add a suggested IoT object. The messaging system will then maintain a record of the decline such that the suggested IoT object is not provided to the user again. The messaging system may also stop providing a particular suggested IoT object if a user has ignored the suggested IoT object for a certain period of time and/or a certain number of times suggested. The messaging system may actively learn and adapt based on the user's actions to provide more useful suggestions.

A suggested IoT object may include a flow or control system created by another user. Such flows may be subscribed to by the first IoT object. The first IoT object may then utilize the flow, such as by initiating the flow using an input by the first IoT device, or by inserting a UUID associated with the first IoT device into the flow such that when the flow is run, the first IoT device performs an action based on an operation of the flow. In some embodiments, using the flow enables the first IoT object to control all or part of an IoT object involved in the flow, such as a light or sensor controlled by the flow, as well as control and/or manipulate the flow itself. In other embodiments, the suggested flow may include a blank for the user of the first IoT object to insert a UUID of a similar device owned or otherwise accessible by the first IoT object. For example, a second user may create a flow that controls when a light bulb turns on. The user of the first IoT device may have a similar light bulb and may receive a suggestion to use the flow with his own light bulb by inserting the UUID of his light bulb into the flow.

In some embodiments, one or more suggested IoT objects may be provided even if the second IoT object is not found and/or not connected. For example, the first IoT object 502 may fail to locate and/or connect with the second IoT object 504. One or more suggested IoT objects may still be provided to the first IoT device 502 based on the attempt to locate and/or connect with the second IoT object 504.

It will be appreciated that the systems described in FIGS. 3-5 may detect IoT devices connectable to a messaging system. The IoT devices may include sensors, devices, computing devices, systems, third-party messaging accounts, and/or any other device. The various IoT device and objects may be connectable with one another through the messaging systems, and in some cases, one IoT object may gain control of another IoT object, such as sensors, processors, and/or other mechanisms. In some embodiments, location based searching, proximity based searching, suggestion searching, and/or searching using other criteria may be used in a single application. For example, one or more suggested IoT devices may be provided based at least in part on the suggested IoT devices being within a detection radius of a first IoT device as described above with reference to FIG. 3.

FIG. 6 illustrates an embodiment of a process 600 of facilitating a location-based search for an IoT device. In some aspects, the process 600 may be performed by a computing device, such as one or more network servers of the messaging systems 102, 202, 204, 314, 414, or 514 shown in FIGS. 1-5. While specific examples may be given of a network server performing the process 600, one of ordinary skill in the art will appreciate that other devices may perform the process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes receiving, on a cloud computing messaging system, a communication from a first IoT device, wherein the first IoT device is communicatively connected with the cloud computing messaging system using a first connection protocol, wherein the communication comprises a location query, and wherein the communication is received using the first connection protocol. In some embodiments, the cloud computing messaging system may be a network server of a messaging system (e.g., messaging system 102, 202, 204, 314, 414, or 514). For example, the first IoT device may transit a communication containing a location query to the cloud computing messaging system. The communication may be received by the cloud computing messaging system directly from the first IoT device over a wide area network, or may be received via a messaging system gateway (e.g., messaging system gateway 114 or 206) or a mobile gateway (e.g., mobile gateway 118) via a local area network and/or a personal area network. In some embodiments, the first IoT device may include a messaging system interface (e.g., messaging system interface 116, 208, 210, 212, or 214). The first connection protocol may be a connection protocol that is native to the first IoT device. The location query may include a search radius and/or an altitude, such that IoT devices located within the search radius and/or at a particular altitude or within an altitude range are queried. The location query may also include a geofence defined by the communication received from the first IoT device.

At 604, the process 600 includes determining a second IoT device having a location, wherein the location matches the location query, and wherein the second IoT device is connectable using a second connection protocol. For example, the first IoT device may be assigned a first UUID, and the second IoT device may be assigned a second UUID. The received communication may include the second UUID (e.g., in a field of a communication packet), and the second IoT device and the second connection protocol used by the second IoT device may be determined based on the second UUID. For example, the computing device may refer to a registry store (e.g., in a device directory of messaging system 202) that is associated with the second UUID in order to determine the connection protocol used by the second IoT device. In some embodiments, the first connection protocol and the second connection protocol include machine-to-machine connection protocols. For example, the first connection protocol may be a MQTT connection protocol and the second connection protocol may be a HTTP connection protocol. In some embodiments, the first connection protocol and the second connection protocol may be the same. In some embodiments, determining the second IoT device includes detecting any IoT device that is connectable directly or indirectly with the cloud computing messaging system. Determining the second IoT device may also and/or alternatively include polling a database of IoT devices to find one or more of the IoT devices at the location.

At 606, the process 600 includes transmitting information to the first IoT device, wherein the information is related to the second IoT device, and wherein the information is transmitted using the first connection protocol. At 608, the process 600 includes receiving a transmission from the first IoT device for the second IoT device using the first connection protocol. At 610, the process 600 includes translating the transmission from the first connection protocol to the second connection protocol. The second connection protocol corresponds to the protocol with which the second IoT device is connected to the cloud computing messaging system. In some embodiments, the first IoT device may not be configured to communicate using the second connection protocol, and the second IoT device may not be configured to communicate using the first connection protocol. At 612, the process 600 includes transmitting the translated transmission to the second IoT device using the second protocol.

In some embodiments, the process 600 may include determining a third IoT device having a second location, wherein the second location matches the location query, and wherein the third IoT device is connectable using a third connection protocol. The process 600 may include transmitting additional information to the first IoT device, wherein the additional information is related to the third IoT device, wherein the additional information is transmitted using the first connection protocol.

In some embodiments, the communication may include a device type or a status of the second IoT device. For example, a status may include whether the device is currently powered and/or enabled for a particular function. In some embodiments, the second location is detected using one or more of a geo-Internet Protocol, a global positioning satellite sensor of the second IoT device, or other location sensor of the second IoT device. This information may be collected with random polling and/or whenever a message is received by the second IoT device. In some embodiments, the information transmitted to the first IoT device comprises a UUID associated with the second IoT device. The UUID may be used by the first IoT device and the messaging system to identify and communicate with a second IoT device, such as by tagging messages with the UUID.

FIG. 7 illustrates an embodiment of a process 700 of facilitating the detection of an IoT object within the proximity of another IoT device. In some aspects, the process 600 may be performed by a computing device, such as one or more network servers of the messaging systems 102, 202, 204, 314, 414, or 514 shown in FIGS. 1-5. While specific examples may be given of a network server performing the process 700, one of ordinary skill in the art will appreciate that other devices may perform the process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving, on a cloud computing messaging system, a communication from a first IoT device, wherein the first IoT device is communicatively connected with the cloud computing messaging system using a first connection protocol, wherein the communication comprises a detection radius of the first IoT device, and wherein the communication is received using the first connection protocol. In some embodiments, the cloud computing messaging system may be a network server of a messaging system (e.g., messaging system 102, 202, 204, 314, 414, or 514). For example, the first IoT device may transit a communication containing a detection radius to the cloud computing messaging system. The communication may be received by the cloud computing messaging system directly from the first IoT device over a wide area network, or may be received via a messaging system gateway (e.g., messaging system gateway 114 or 206) or a mobile gateway (e.g., mobile gateway 117) via a local area network and/or a personal area network. In some embodiments, the first IoT device may include a messaging system interface (e.g., messaging system interface 116, 207, 210, 212, or 214). The first connection protocol may be a connection protocol that is native to the first IoT device. The detection radius may be a connection range of the first connection protocol. For example, the detection radius may be determined based on a radius of a signal produced by the first IoT device, such as a signal using a Bluetooth™ or NFC protocol. In other embodiments, the detection radius may be a specified distance from the first IoT device. For example, a user of the first IoT device may select a radius in which to search for a second IoT device.

At 704, the process 700 includes determining a second IoT device based on the second IoT device being located within the detection radius of the first IoT device, wherein the second IoT device is connectable using a second connection protocol. For example, the first IoT device may be assigned a first UUID, and the second IoT device may be assigned a second UUID. The received communication may include the second UUID (e.g., in a field of a communication packet), and the second IoT device and the second connection protocol used by the second IoT device may be determined based on the second UUID. For example, the computing device may refer to a registry store (e.g., in a device directory of messaging system 202) that is associated with the second UUID in order to determine the connection protocol used by the second IoT device. In some embodiments, the first connection protocol and the second connection protocol include machine-to-machine connection protocols. For example, the first connection protocol may be a MQTT connection protocol and the second connection protocol may be a HTTP connection protocol.

At 706, the process 700 includes transmitting information to the first IoT device, wherein the information is related to the second IoT device, wherein the additional information is transmitted using the first connection protocol. In some embodiments, the process 700 includes receiving a request comprising one or more criteria, wherein the second device matches the criteria in the request. For example, the criteria may include one or more of a location of the second IoT device, a type of the second IoT device, a distance from the first IoT device, a status of the second IoT device, or an altitude of the IoT second device. In some embodiments, the communication is received upon the first IoT device reaching a specified altitude, a specified destination, and/or a specific time. This is particularly useful when communicating with a vehicle, vehicle device, and/or a device being transported on a vehicle. The communication may be based on the vehicle reaching a particular checkpoint, such as a time or location-based checkpoint.

FIG. 8 illustrates an embodiment of a process 800 of providing suggested IoT object with which another IoT object can connect. In some aspects, the process 600 may be performed by a computing device, such as one or more network servers of the messaging systems 102, 202, 204, 314, 414, or 514, shown in FIGS. 1-5. While specific examples may be given of a network server performing the process 800, one of ordinary skill in the art will appreciate that other devices may perform the process 800.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 802, the process 800 includes receiving, on a cloud computing messaging system, a communication from a first IoT object, wherein the first IoT object is communicatively connected with the cloud computing messaging system using a connection protocol, wherein the first IoT object comprises a first IoT device, a first third-party messaging account, or a first computing device, wherein the communication comprises a request to connect with a second IoT object, wherein the second IoT object comprises a second IoT device, a second third-party messaging account, or a second computing device, and wherein the communication is received using the connection protocol. In some embodiments, the cloud computing messaging system may be a network server of a messaging system (e.g., messaging system 102, 202, 204, 314, 414, or 514). For example, the first IoT device may transit a communication to the cloud computing messaging system. The communication may be received by the cloud computing messaging system directly from the first IoT device over a wide area network, or may be received via a messaging system gateway (e.g., messaging system gateway 114 or 206) or a mobile gateway (e.g., mobile gateway 118) via a local area network and/or a personal area network. In some embodiments, the first IoT device may include a messaging system interface (e.g., messaging system interface 116, 208, 210, 212, or 214). The connection protocol may be a connection protocol that is native to the first IoT device.

At 804, the process 800 includes analyzing a plurality of IoT objects against one or more characteristics of the second IoT object to identify a suggested IoT object, wherein each of the plurality of IoT objects is connectable with the cloud computing messaging system.

At 806, the process 800 includes transmitting information related to the suggested IoT object to the first IoT object, wherein the information is transmitted using the first connection protocol. The information may include a universal unique identifier associated with the suggested IoT object usable to identify the suggested IoT object for subsequent communications.

In some embodiments, the suggested IoT object is connected with the computing device through a third IoT object in direct connection with the computing device. In other embodiments, the suggested IoT object is connected with the cloud computing messaging system through a third IoT object in direct connection with the cloud computing messaging system.

In some embodiments, the suggested IoT object is selected from the plurality of IoT objects, and wherein the suggested IoT object includes at least a portion of the one or more characteristics of the second IoT object. The one or more characteristics of the second IoT object may include one or more of an IoT object type, a location, and/or a function, although any searchable feature, component, and/or functionality of an IoT device may be used as criteria.

In some embodiments, the suggested IoT object includes a first suggested IoT object. The process may further include identifying a second suggested IoT device and transmitting additional information that is related to the second suggested IoT object to the first IoT object.

In some embodiments, the suggested IoT object is further identified based on a threshold number of IoT objects with which the suggested IoT device is connected to IoT objects of other users, wherein the IoT objects of other users connect to IoT objects having at least a portion of the one or more characteristics of the second IoT object.

Figure 9:
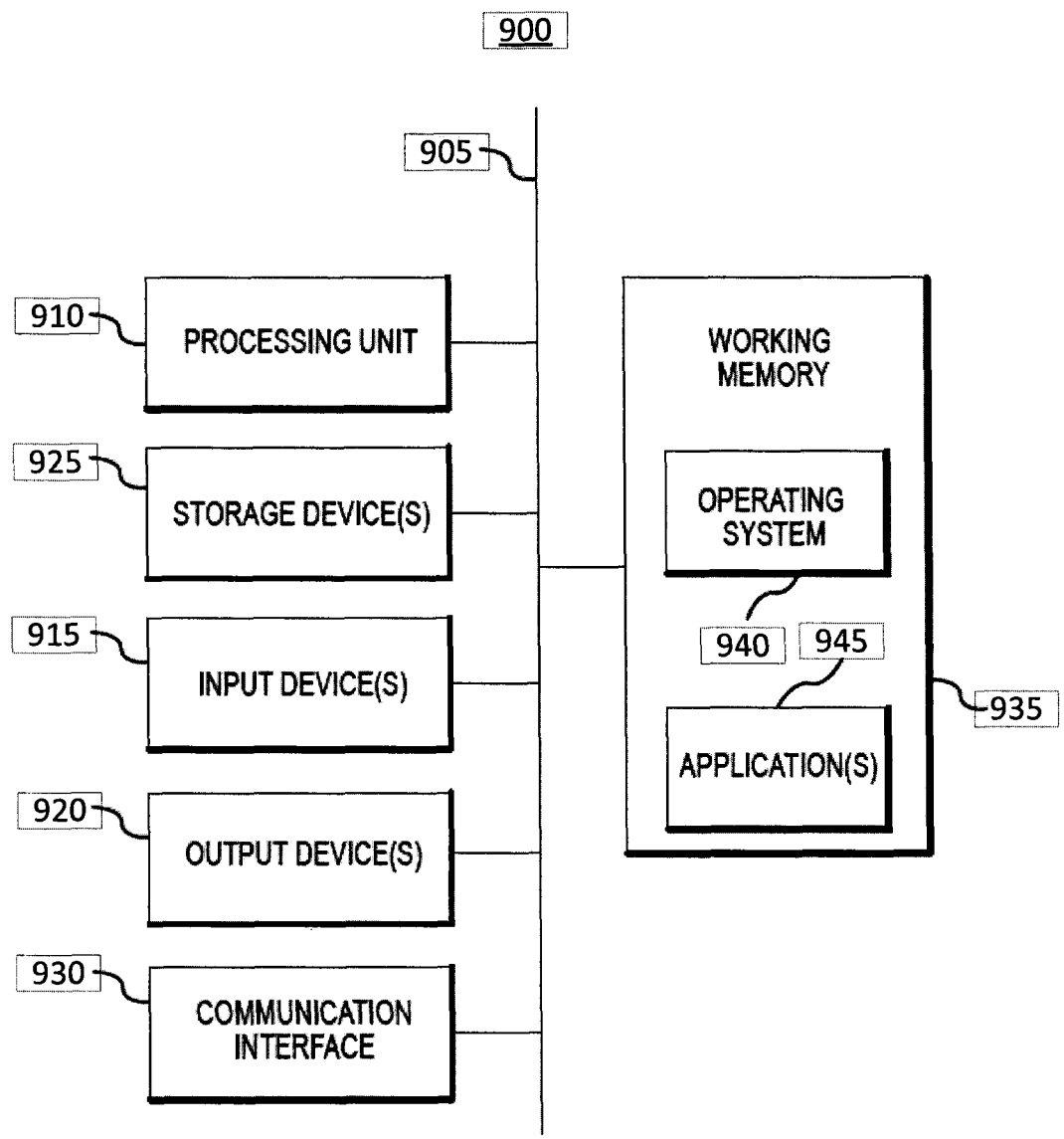
FIG. 9 is a block diagram of an example of a computing device or system, according to some embodiments.

A computer system as illustrated in FIG. 9 may be incorporated as part of the previously described computing devices and systems. For example, computer system 900 can represent some of the components of the messaging system 102, platform network 108 of FIG. 1, as well as any of the IoT devices, third-party messaging accounts, and/or computing devices and systems described herein. FIG. 9 provides a schematic illustration of one embodiment of a computer system 900 that can perform the methods provided by various other embodiments, as described herein, and/or can function as the host computer system, a remote kiosk/terminal, a point-of-sale device, a mobile device, and/or a computer system. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include a processing unit 910, including without limitation one or more general-purpose processors and/or one or more special-purpose processors (such as digital signal processing chips, graphics acceleration processors, and/or the like); one or more input devices 915, which can include without limitation a mouse, a keyboard, a touchscreen, a global positioning system (GPS) receiver, a motion sensor, a camera, and/or the like; and one or more output devices 920, which can include without limitation a display device, a speaker, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communication interface 930, which can include without limitation a modem, a network card (wireless or wired), an infrared communication device, a wireless communication device and/or chipset (such as a Bluetooth™ device, an 802.11 device, a WiFi device, a Imax device, an NFC device, cellular communication facilities, etc.), and/or similar communication interfaces. The communication interface 930 may permit data to be exchanged with a network (such as the network described below, to name one example), other computer systems, and/or any other devices described herein. In many embodiments, the computer system 900 will further comprise a non-transitory working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASICS), a software method, etc.) or generic (e.g., processing unit 910, applications 945, etc.) Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processing unit 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processing unit 910 to perform one or more procedures of the methods described herein.

In an embodiment implemented using the computer system 900, various computer-readable storage media might be involved in providing instructions/code to processing unit 910 for execution and/or might be used to store and/or carry such instructions/code (e.g., as signals). In many implementations, a computer-readable storage medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communication interface 930 (and/or the media by which the communication interface 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a non-transitory storage device 925 either before or after execution by the processing unit 910.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing description, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, Rams, EPROMs, Proms, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A cloud computing network messaging system for facilitating a location-based search for an Internet of Things (IoT) device, the cloud computing network messaging system comprising:
    one or more data processors;
    a receiver;
    a transmitter; and
    a non-transitory computer-readable storage medium containing instructions which when executed on the one or more data processors, cause the one or more processors to perform operations including:
        receiving, using the receiver, a communication from a first IoT device, wherein the first IoT device is communicatively connected with the cloud computing network messaging system using a first connection protocol, wherein the communication comprises a location query and a function query, and wherein the communication is received using the first connection protocol;
        providing a list of a plurality of IoT devices, wherein plurality of IoT devices includes only IoT devices having both a location matching the location query and a function matching the function query;
        determining a second IoT device from the list of the plurality of IoT devices with which to communicate, the second IoT device having a location and a function, wherein the location matches the location query and the function matches the function query, and wherein the second IoT device is connectable using a second connection protocol;
        transmitting, using the transmitter, information to the first IoT device, wherein the information is related to the second IoT device, and wherein the information is transmitted using the first connection protocol;
        receiving a transmission from the first IoT device for the second IoT device using the first connection protocol;
        translating the transmission from the first connection protocol to the second connection protocol; and
        transmitting the translated transmission to the second IoT device using the second connection protocol.

2. The cloud computing network messaging system of claim 1, wherein the location query comprises one or more of a search radius or an altitude.

3. The cloud computing network messaging system of claim 1, wherein the first connection protocol is different than the second connection protocol.

4. The cloud computing network messaging system of claim 1, wherein the non-transitory computer-readable storage medium contains instructions which when executed on the one or more data processors, cause the one or more data processors to perform operations including:
    determining a third IoT device having a second location, wherein the second location matches the location query, and wherein the third IoT device is connectable using a third connection protocol; and
    transmitting additional information to the first IoT device, wherein the additional information is related to the third IoT device, wherein the additional information is transmitted using the first connection protocol.

5. The cloud computing network messaging system of claim 1, wherein the communication further comprises one or more of a device type or a status of the second IoT device.

6. The cloud computing network messaging system of claim 1, wherein the location is detected using one or more of a geo-Internet Protocol, a global positioning satellite sensor of the second IoT device, or other location sensor of the second IoT device.

7. The cloud computing network messaging system of claim 1, wherein the information transmitted to the first IoT device comprises a universally unique identifier associated with the second IoT device.

8. A computer-implemented method of facilitating a location-based search for an Internet of Things (IoT) device using cloud computing network messaging system, the method comprising:
    receiving, on the cloud computing network messaging system, a communication from a first IoT device, wherein the first IoT device is communicatively connected with the cloud computing network messaging system using a first connection protocol, wherein the communication comprises a location query and a function query, and wherein the communication is received using the first connection protocol;
    providing a list of a plurality of IoT devices, wherein plurality of IoT devices includes only IoT devices having both a location matching the location query and a function matching the function query;
    determining a second IoT device from the list of the plurality of IoT devices with which to communicate, the second IoT device having a location and a function, wherein the location matches the location query and the function matches the function query, and wherein the second IoT device is connectable using a second connection protocol;
    transmitting information to the first IoT device, wherein the information is related to the second IoT device, and wherein the information is transmitted using the first connection protocol;
    receiving a transmission from the first IoT device for the second IoT device using the first connection protocol;
    translating the transmission from the first connection protocol to the second connection protocol; and
    transmitting the translated transmission to the second IoT device using the second protocol.

9. The method of claim 8, further comprising:
    determining a third IoT device having a second location, wherein the second location matches the location query, and wherein the third IoT device is connectable using a third connection protocol; and
    transmitting additional information to the first IoT device, wherein the additional information is related to the third IoT device, wherein the additional information is transmitted using the first connection protocol.

10. The method of claim 8, wherein the location query comprises a geofence defined by the communication received from the first IoT device.

11. The method of claim 8, wherein the information transmitted to the first IoT device comprises a universally unique identifier associated with the second IoT device.

12. The method of claim 8, wherein the first connection protocol is different than the second connection protocol.

13. The method of claim 8, wherein determining the second IoT device comprises detecting any IoT device that is connectable directly or indirectly with the cloud computing network messaging system.

14. The method of claim 8, wherein determining the second IoT device comprises polling a database of IoT devices to find one or more of the IoT devices at the location.

15. A computer-program product tangibly embodied in a non-transitory machine-readable storage medium of a cloud computing network messaging system, including instructions configured to cause one or more data processors to:
 receive a communication from a first IoT device, wherein the first IoT device is communicatively connected with the cloud computing network messaging system using a first connection protocol, wherein the communication comprises a location query and a function query, and wherein the communication is received using the first connection protocol;
 provide a list of a plurality of IoT devices, wherein plurality of IoT devices includes only IoT devices having both a location matching the location query and a function matching the function query;
 determine a second IoT device from the list of the plurality of IoT devices with which to communicate, the second IoT device having a location and a function, wherein the location matches the location query and the function matches the function query, and wherein the second IoT device is connectable using a second connection protocol;
 transmit information to the first IoT device, wherein the information is related to the second IoT device, wherein the information is transmitted using the first connection protocol;
 receive a transmission from the first IoT device for the second IoT device using the first connection protocol;
 translate the transmission from the first connection protocol to the second connection protocol; and
 transmit the translated transmission to the second IoT device using the second protocol.

16. The computer-program product of claim 15, further comprising instructions configured to cause the one or more data processors to:
 determine a third IoT device having a second location, wherein the second location matches the location query, and wherein the third IoT device is connectable using a third connection protocol; and
 transmit additional information to the first IoT device, wherein the additional information is related to the third IoT device, wherein the additional information is transmitted using the first connection protocol.

17. The computer-program product of claim 15, wherein the location query comprises a geofence defined by the communication received from the first IoT device.

18. The computer-program product of claim 15, wherein the information transmitted to the first IoT device comprises a universally unique identifier associated with the second IoT device.

19. The computer-program product of claim 15, wherein the first connection protocol is different than the second connection protocol.

20. The computer-program product of claim 15, wherein determining the second IoT device comprises detecting any IoT device that is connectable directly or indirectly with the cloud computing network messaging system.

\* \* \* \* \*